(12) United States Patent
Pearson et al.

(10) Patent No.: US 7,390,342 B2
(45) Date of Patent: Jun. 24, 2008

(54) FILTER ELEMENT

(75) Inventors: John Pearson, Co. Curham (GB);
Thomas Stephen Bittle, Newcastle Upon Tyne (GB); Raymond Francis Trowsdale, Consett (GB); Brian Lane, Hebburn (GB)

(73) Assignee: Parker Hannifin Limited, Hemel Hpmpstead (GB)

( * ) Notice: Subject to any disclaimer, the term of this patent is extended or adjusted under 35 U.S.C. 154(b) by 22 days.

(21) Appl. No.: 11/624,315

(22) Filed: Jan. 18, 2007

(65) Prior Publication Data

US 2007/0186523 A1  Aug. 16, 2007

Related U.S. Application Data

(63) Continuation of application No. PCT/GB2005/002915, filed on Jul. 26, 2005.

(30) Foreign Application Priority Data

Aug. 5, 2004  (GB)  ................... 0417455.3

(51) Int. Cl.
*B01D 46/00*  (2006.01)

(52) U.S. Cl. .............................. 55/486; 55/423; 55/488; 55/498

(58) Field of Classification Search .................. 55/498, 55/482, 485–487, 423, DIG. 17, DIG. 25, 55/510

See application file for complete search history.

(56) References Cited

U.S. PATENT DOCUMENTS

| 3,308,610 | A | * | 3/1967 | Springer et al. | ............... 55/471 |
| 3,527,027 | A | * | 9/1970 | Knight | ........................ 96/134 |
| 3,802,160 | A | * | 4/1974 | Foltz | ............................ 95/273 |
| 4,050,237 | A | * | 9/1977 | Pall et al. | .................. 60/39.08 |
| 4,336,043 | A | * | 6/1982 | Aonuma et al. | ............... 55/483 |
| 5,961,678 | A |   | 10/1999 | Pruette et al. | |

FOREIGN PATENT DOCUMENTS

GB  2033247 A1  5/1980
GB  2261930 A1  6/1993

OTHER PUBLICATIONS

International Search Report in corresponding International Application No. PCT/GB05/002915.

* cited by examiner

*Primary Examiner*—Duane Smith
*Assistant Examiner*—Robert A Clemente
(74) *Attorney, Agent, or Firm*—Christopher H. Hunter

(57) ABSTRACT

A hollow filter element for removing material that is entrained in a gas stream. The filter element comprises a wall of a filtration medium which defines a hollow space so that a gas stream can flow from the space through the wall in order to be filtered. The wall comprises a filtration layer, and a drainage layer located outside the filtration layer in which liquid separated from the gas stream can collect. The filter element further comprises first and second end caps at opposite ends of the space, the first end cap including an inlet for a gas stream to be supplied to the space. The drainage layer extends from the wall over at least a part of the external surface of second end cap, over the face thereof which faces away from the first end cap.

18 Claims, 10 Drawing Sheets

FILTER ELEMENT

CROSS REFERENCE TO RELATED APPLICATIONS

This application is continuation of copending International Application No. PCT/GB05/002915 filed Jul. 26, 2005, which designated the United States, the disclosure of which is incorporated herein by reference, and which claims priority to Great Britain Patent Application 0417455.3, filed Aug. 5, 2004.

BACKGROUND OF THE INVENTION

The present invention relates to a filter element for removing material that is entrained in a gas stream such as liquid in an aerosol form, and to a filter assembly in which the filter element is used.

SUMMARY OF THE INVENTION

Filtration of gas in a compressed gas system is generally required so that the gas is sufficiently clean for a subsequent application or to minimise adverse effects of impurities on components of the system. For example, removal of compressor oil can be required to minimise chemical contamination and accumulation on valves which might lead to malfunction of the valves.

There are many known filter elements for use in a filter assembly in gas systems. Such filter elements generally comprise a cylindrical filtration layer and a cylindrical anti re-entrainment barrier or a "drainage layer" surrounding the filtration layer on the outside of the filter element. Such filter elements further comprise a bottom end cap having a trough in which the filtration and drainage layers are retained. Such filter elements are generally positioned to be vertical when in use. A gas stream enters the tubular filter element through an inlet port, and flows through the cylindrical walls of the filter element, generally radially outward from the inside of the filter element to the outside. When the assembly is used to collect liquid droplets in the gas stream (for example which is carried in the stream as an aerosol), the filtration layer will cause liquid droplets to coalesce for collection. The coalesced liquid will be carried by the flow of gas to the drainage layer where the liquid can collect. The drainage layer is configured to ensure that re-entry of the liquid into the gas stream is minimised. The liquid will sink to the bottom of the drainage layer and a 'wet band', saturated with the liquid, will form. A filter element of this general kind is disclosed in GB-A-2261830.

After prolonged use of the filter element, the wet band provided by accumulated liquid can increase in depth. The depth of the wet band can increase to the extent that gas flowing through the element wall will pass through the wet band. This can increase the resistance to flow of gas through the filter element, and therefore also an increase in pressure drop across the filter element. Furthermore, gas flowing through or near a saturated part of the drainage layer can draw droplets of liquid from the drainage layer into the gas flow, thereby re-contaminating the gas as it exits the filter element. It can therefore be seen that significant accumulation of liquid in a wet band can reduce the operating efficiency of the filter element. When the operating efficiency is significantly reduced, the filter element in the filter assembly must be replaced, giving rise to expense and possibly also a requirement for the system in which the assembly is used to be shut down.

The present invention provides a filter element in which the drainage layer extends over the end cap, rather than be retained within it, and is folded under the bottom surface of the end cap.

In one aspect, the invention provides a hollow filter element for removing material that is entrained in a gas stream, the filter element comprising:

a wall of a filtration medium which defines a hollow space so that a gas stream can flow from the space through the wall in order to be filtered, the wall comprising a filtration layer, and a drainage layer located outside the filtration layer in which liquid separated from the gas stream can collect, and first and second end caps at opposite ends of the space, the first end cap including an inlet for a gas stream to be supplied to the space, in which the drainage layer extends from the wall over at least a part of the external surface of second end cap, over the face thereof which faces away from the first end cap.

It has been found that the wet band will tend to reside in the part of the drainage layer that is folded under the face of the second end cap which faces away from the first end cap, rather than extend up the drainage layer. This can reduce the tendency for the wet band to build up in the flow path of a gas which flows through the filtration medium. The element of the invention therefore has the advantage that the drainage layer draws the wet band away from the flow path of the gas and allows it to drain from the filter element for collection.

The present invention also has the advantage that the acceptable wet band size is greater than existing filter elements as there is more drainage layer material for the liquid to accumulate in below the point at which the gas flows through the wall of the element. This can be achieved without an unacceptable increase in the height of the filter element.

Accordingly, the drainage layer has the ability to hold more liquid without affecting the operating efficiency of the filter element adversely. This can mean that the useful operating lifetime of the filter element can be increased compared with existing filter elements.

Preferably, the filter element has a substantially constant cross-sectional shape along its length. Preferably, the cross-section of the filter element is generally round. For example, the filter element may be circular or elliptical. However, it will be appreciated that the cross-section of the filter element need not be round. For example, the cross-section could be the shape of a square, triangle, or any other regular or irregular shape.

The shape of the filter element when viewed along its axis (its cross-section shape) will generally be approximately constant over at least most of the length of the element. However, it will be appreciated that its cross-section shape need not be constant. For example, the filter element could be conical or pyramidal.

The cross-sections of the end caps and the wall at their interfaces should be broadly the same so that the end caps can be fitted together with the wall to provide fluid tight seals. Preferably, the filtration and drainage layers are retained and sealed within a trough which is provided in the first end cap.

The first end cap can include an inlet tube extending from the inlet in the first end cap into the hollow space defined by the wall of the filter element. The inlet tube can aid the even distribution of gas through the wall of the filter element. Preferably the inlet and the inlet tube are co-axial with the first end cap, however, it will be appreciated that this need not be the case.

Preferably, the tube is approximately straight, at least in the portion of its length that is within the hollow space. Preferably the ratio of the length of the tube (measured from the inner surface of the end cap on which the tube is mounted) to the length of the filter element (measured between the inner surface of the opposite end caps) is at least about 0.15, more preferably at least about 0.20, especially at least about 0.25.

The first end cap can have an opening extending around the periphery of the inlet tube for supply of the gas stream to the element wall close to the end cap. This can be advantageous as it can aid in the even distribution of contaminant material across the element wall.

The inlet tube can be formed integrally with the first end cap, or can be formed separately and subsequently fastened to the first end cap.

It can be advantageous to form the inlet tube separately as it allows the for the production of a variety of different inlet tubes that can be fastened to standard end caps. However, it can also be advantageous to form the first end cap and the inlet tube as one piece as this can reduce manufacturing costs. This can especially be the case if a variety of different inlet tubes are not used in different applications.

If the inlet tube is formed separately from the first end cap, then the interface between the first end cap and the inlet tube should form a fluid tight seal. Preferably, the tube and the first end cap are formed form the same material. Preferably, the inlet tube can be fastened to the first end cap so that it can be subsequently removed. For example, preferably the inlet tube is fastened to the first end cap through the use of a mechanical fastening such as a latch, co-operating screw threads, or engaging bayonet formations. More preferably, the inlet tube and the first end cap are shaped and sized so that the inlet tube is held within the first end cap by the stictional force between the inlet tube and the first end cap.

It can be advantageous in some applications to fasten the inlet tube to the first end cap so that the inlet tube cannot be subsequently removed from the first end cap. In this case, preferably the inlet tube is fastened to the first end cap without the use of another material. For example, preferably, the inlet port is fastened to the first end cap through the use of a welding technique, for example, ultrasonic or heat welding. However, it will be appreciated that the inlet port can be fastened to the first end cap through the use of another material such a bonding agent, for example an adhesive.

The inlet tube can have at least one helically extending rifle formation in its internal wall by which a helical flow is imparted to the gas stream when it leaves the tube. This can facilitate a more even distribution of contaminant material in the gas stream over the length of the filter element. Furthermore, primary separation of liquid droplets from the gas stream can be facilitated as a result of the helical flow of gas entering the element. Details of a filter element having an inlet tube with at least one helically extending rifle formation in its internal wall are disclosed in the co-pending PCT application filed with the present application which claims priority from UK Patent Application NNo. 0417457.9. Subject matter that is disclosed in that application is incorporated in the specification of the present application by this reference.

The inlet tube can have at least one opening in its side wall. Preferably, the inlet tube has an upstream band, a middlestream band and a downstream band, the said bands being axially adjacent to one another and non-overlapping, having equal axial lengths of at least 5% of the length of the inlet tube, and being arranged such their planes are perpendicular to the axis of the inlet tube, and in which the proportion of the area of the side wall that is open in the upstream band is smaller than that in the middlestream band, and the proportion of the area of the side wall that is open in the middlestream band is smaller than that in the downstream band. This can help ensure that the supply of gas into the filter element is graded, which can lead to a more even distribution of gas flowing through the element wall. Details of a filter element having an inlet tube with at least one opening in its side wall are disclosed in disclosed in the co-pending PCT application filed with the present application which claims priority from UK Patent Application No. 0417462.9. Subject matter that is disclosed in that application is incorporated in the specification of the present application by this reference.

The filtration medium should generally be sealed to the second end cap so that there is no path for gas to flow past the filtration medium. Preferably, the filtration layer is retained and sealed within a trough which is provided in the second end cap. Preferably, the drainage layer extends over the outermost edge of the second end cap and is sealed to the undersurface of the second end cap.

The filtration medium (or one or more layers thereof) can be sealed to the end caps using a quantity of a bonding material such as an adhesive. The bonding material should be selected according to fluids with which the element will come into contact when in use so that there are no adverse reactions between the bonding material and the fluids. The filtration medium might be sealed to the end caps using other techniques such as welding, for example by localised application of heat, or by ultrasonic welding.

The drainage medium (or one or more layers thereof) can be sealed to the first end cap using a quantity of a bonding material such as an adhesive. The bonding material should be selected according to fluids with which the element will come into contact when in use so that there are no adverse reactions between the bonding material and the fluids. The drainage medium might be sealed to the first end cap using other techniques such as welding, for example by localised application of heat, or by ultrasonic welding.

Preferably one or each of the end caps is formed from a polymeric material. Preferred polymeric materials include polyolefins (especially polyethylene and polypropylene), polyesters, polyamides, polycarbonates and the like. Polymeric materials used for the end caps can be reinforced, for example by fibrous materials (especially glass fibres or carbon fibres). Materials other than polymeric materials can be used, for example metals. The first and second end caps will generally be formed from the same material or materials.

Preferably one or each of the end caps is formed by moulding, for example, by injection moulding.

Generally, the filter element will be arranged in use with the first end cap located above the second end cap, when the first end cap might be referred to as the top end cap, and the second end cap referred to as the bottom end cap.

Preferably, the drainage layer extends over at least 75% of the area of the face of the second end cap which faces away from the first end cap. More preferably, the drainage layer extends over at least 80% of the area of the face of the second end cap which faces away from the first end cap. Especially preferably, the drainage layer extends over at least 85% of the area of the face of the second end cap which faces away from the first end cap.

The filter element can include a clamp which can be fastened to the second end cap with the drainage layer clamped between the clamp and the end cap. The clamp can include a pin which can extend into the material of the end cap to form the connection between them. The clamp can be provided with a threaded stud which can be received in a threaded bore in the end cap. The clamp can provide a threaded bore, in which a threaded stud on the end cap can be received. Alternatively, the clamp and the end cap can be fastened together by other press-fit arrangements, for example by a press-stud arrangement or the like.

The clamp can be made from polymeric materials or from metallic materials. It should have sufficient rigidity to ensure that the drainage layer is retained in place. Metallic materials can often be preferred for this application. Suitable materials should not have any adverse reaction with fluids with which the element will come into contact when in use.

Preferably, the second end cap includes a flange which defines an annular slot in which the drainage layer can be inserted to retain it in place over the external surface of the end cap. The filter element can include an elastic ring member which can be fitted into the annular slot, over the drainage layer, to retain the drainage layer in the slot. Preferably, the surface of the flange remote from the end cap will generally be approximately planar, extending perpendicular to the axis of the element. Preferably, the surface of the flange which defines the slot is roughened, textured or otherwise featured so that the drainage layer is engaged within the slot.

Preferably, the slot is tapered inwardly from its peripheral edge towards the centre, so that the material of the drainage layer is compressed progressively as it is inserted into the slot. The slot is therefore generally V-shaped when the end cap is viewed from one side.

The flange can be spaced from the second end cap by a stem extending between them. More than one stem can be provided. Preferably, only a single stem is provided. Preferably, the flange and the stem are co-axial. Preferably, the ratio of the transverse dimension of the stem to the transverse dimension of the flange not more than about 0.5. More preferably, the ratio of the transverse dimension of the stem to the transverse dimension of the flange is at least about 0.25. The smaller the transverse dimension of the stem with respect to the transverse dimension of the flange, the larger the area between the second end cap and the flange in which the drainage layer can be received. This can allow for a larger volume of drainage layer to be folded under the face of the second end cap. Accordingly, the provision of a smaller stem can reduce the tendency for the wet band to build up in the flow path of a gas.

The transverse dimension of the flange (which will be its diameter if it is circular) can be the same as or larger than that of the part of the second end cap which closes the hollow space. However, preferably, the transverse dimension of a flange is smaller than that of the second end cap. Preferably, the ratio of the transverse dimension of the flange to the transverse dimension of the second end cap is not more than about 0.8, more preferably, not more than about 0.5. This can help to minimise obstructions to drainage of collected liquid from the drainage layer.

The drainage layer can be held within the annular space defined by the flange without the use of another component. For example, the second end cap and flange can be configured so that drainage layer can be held by the friction forces between the drainage layer and the flange and second end cap. Further, the drainage layer can be held within the annular space such as welding, for example by localised application of heat, or by ultrasonic welding.

Preferably, the flange is of sufficient size that the drainage layer that the drainage layer can be received under it, between it and the second end cap, and can be held in position through use of another component. This can allow for the drainage layer to be removed from within the annular slot. Preferably, the flange is provided on a stem. The length of the stem defines the width of the slot and at its inner end. Preferably, the other component is a ring member, especially an elastic ring member, which can be fitted into the annular slot, over the drainage layer, to retain the drainage layer in the slot. The other component can hold the drainage layer against the stem.

Preferably, the thickness of the ring member is such that it is an interference fit in the slot when the slot contains the drainage layer, especially when the slot tapers inwardly from its peripheral edge towards the centre. When the ring has elastic properties, it is preferred that it is held tension as it tries to contract to a smaller diameter, as a result of the frictional forces between the drainage layer and one of the walls of the slot.

Suitable materials for an elastic ring member include elastomeric polymeric materials, for example certain rubbers. The ring member might be formed with suitable resilient characteristics from a metal, for example as a helical spring.

Preferably, the flange on the second end cap has at least one aperture formed in it through which liquid within the drainage layer can drain.

The edge of the flange on the second end cap which faces the drainage layer when inserted into the annular space can be rounded. This can help to minimise undesirable stress concentrations on the drainage layer, and can minimise obstruction to drainage of collected liquid from the drainage layer.

The surface of the flange which faces the slot can have at least one protrusion formed in it, directed into the annular slot. This can provide localised compression of the part of the drainage layer where it is inserted into the slot. This localised compression can encourage drainage of liquid from the drainage layer. There can be more than one protrusion. Preferably, the or each protrusion extends to the periphery of the flange. Protrusions can be in the form of number of raised castellation-like formations arranged around the perimeter of the flange.

Preferably, the second end cap includes an upstand portion which extends towards the first end cap, into the space within the filter element. This can help to encourage fluid to flow transversely towards the wall of the element. Preferably, the upstand portion is located centrally within the element.

Preferably, the upstand portion of the second end cap tapers inwardly towards the end thereof which is closer to the first end cap. The upstand portion can have a substantially constant cross-sectional shape along its length. Preferably, the cross-section of the upstand portion is generally round, for example elliptical or especially circular.

When the second end cap includes an upstand portion that has a circular cross-section, and when the second end cap includes a flange and a stem, preferably the stem and the upstand portion are co-axial, and preferably the diameter of the upstand portion is the same as that of the stem. This can ease construction of the second end cap, especially when the second end cap is formed by moulding.

Materials suitable for use in a filtration filter element will be selected according to the nature of the gas that is being filtered, the nature of the contaminants (liquid droplets, aerosols, solid particles etc) to be filtered from the gas, the pressure differential across the filter and so on. Such materials are known, including those used by Domnick Hunter Limited in products which are available under the trade mark OIL-X. Suitable materials include, borosilicate and other glass fibres, activated carbon minerals, activated silica materials and so on. A filtration layer can be made from woven fibres. However, as will be appreciated, a filtration layer can be made from sheets of non-woven fibres. For example, a microfibre filtration layer made from fine organic or inorganic fibres is preferred. Preferably, a coarser fibre layer is fitted on the inside of a microfibre filtration layer. This coarser layer can protect a microfibre filtration layer from gross pollution.

Preferably, the filtration layer can comprise a layer of a material which has been folded so that it is fluted (or pleated). This can increase the surface area of the filtration layer through which air flowing through the filter element will pass. This can also help to increase the rigidity of the filtration layer.

The element can include at least one support for the filtration layer. This can help to retain the filtration layer in its position within the filter element. This can also increase the rigidity of the filter element. A support can be provided within the hollow space, positioned against the internal surface of the filtration layer. A support can be positioned outside the filtration layer, for example between the filtration layer and the drainage layer. Preferably, a first support made of a rigid material is positioned within the hollow space against the internal surface of the filtration layer, and a second support made of rigid material is positioned outside the filtration layer. Preferably, each support is perforated to allow a gas stream to flow therethrough. The material for the support should have sufficient rigidity to withstand the forces to which the element is exposed, during assembly of the element and an assembly containing the element, and during use. The material can be metallic, for example a stainless steel.

The drainage layer of the filter element should comprise a material that is capable of retaining liquid that has been coalesced by the filtration layer, and is carried to the drainage layer by a gas stream that flows through the drainage layer. The drainage layer of the filter element will generally be porous, and made from a material which encourages flow of coalesced liquid towards the base of the filter element. Factors affecting the drainage characteristics include pore size and structure, and the material of the drainage layer, including for example the surface energy of liquid which is in contact with the material. Materials suitable for use in the drainage layer are used in similar products sold by Domnick Hunter Limited under the trade mark OIL-X. Suitable materials include open-celled foam plastics, felted fabric material, and expanded foam materials.

In another aspect, the invention provides a filter assembly for collecting material that is entrained in a gas stream which comprises a filter element as discussed above, and a housing in which the filter element is received.

The housing can comprise a head and a body. The head and the body can be separable, providing access to the interior of the housing, especially for replacement of the filter element. The head and body should be capable of being connected to one another to form a fluid tight seal, for example by means of cooperating bayonet formations or by means of cooperating screw threads.

The housing should provide an inlet port for a gas stream to flow into the housing, and an outlet port through which gas which has passed through the filtration medium can leave the housing. The ports will generally be provided in the housing head.

Preferably, the first end cap or the second end cap (or each of the end caps) has means for locating the filter element in the housing of the filter assembly, especially to control the alignment of the element in the housing. For example, the first end cap can have at least one rib which is received in an appropriate groove in a housing. This can also facilitate the loosening of the filter element from the housing head part when the housing body is rotated relative to the housing head part. Details of a filter assembly in which the first end cap has at least one rib that is received within an appropriate groove in the housing is disclosed in the co-pending PCT application filed with the present application which claims priority from UK Patent Application Nos. 0417463.7 and 0428567.2. Subject matter that is disclosed in that application is incorporated in the specification of the present application by this reference.

Preferably, the housing includes a reservoir in which coalesced liquid which drains from the drainage layer can collect. The reservoir can be provided by a space within the housing below the filter element.

Preferably, the housing includes a drain outlet for coalesced liquid which drains from the drainage layer. The outlet will generally provide for removal of liquid which has collected in a reservoir. The drain should preferably be capable of opening without depressurising the housing. A suitable drain mechanism is disclosed in European Patent Application No. EP-A-81826.

The housing should be formed from a material which is capable of withstanding the internal pressures to which it is subjected when in use. Metals will often be preferred, for example aluminium and alloys thereof, and certain steels.

The inlet at the first end cap of the filter element should be capable of coupling with a part in a housing for the element so that a tight seal is formed. This can ensure that all gas that enters the inlet of the filter assembly, enters the filter element. Techniques for sealing inlet ports are known, for example as disclosed in PCT Application No. WO-A-99/30798.

Preferably, the parts of the housing fit together for the purposes of connection in such a way that the body part as a male part fits within the head part as a female part.

Preferably, the inlet on the first end cap of the filter element has a compressible O-ring seal for forming a fluid tight seal with the head part of the housing.

A flow conduit having a first conduit opening for communication with a port (generally the inlet port in the housing head) for the gas that is to be filtered and a second conduit opening for communication with the inlet on the first end cap, can be provided. Generally, the flow of the gas stream towards and away from the assembly will be horizontal. The filter element will generally be arranged vertically so that the housing head is at the top of the housing with the filter element located depending below it. In such constructions, the axis of the first conduit opening and the axis of the second conduit opening will not be aligned. Generally, the axis of the first conduit opening will be substantially perpendicular to the axis of the second conduit opening.

Preferably, the flow conduit will be configured to provide a smooth flow path for a gas which flows between the first and second conduit openings. The smooth flow path can be constructed to reduce restriction of the flow of the gas stream compared for example with a flow conduit which presents a discontinuous flow path which is sharply angled or contains steps or other obstructions.

The flow conduit can be provided as part of the first end cap. However, preferably the flow conduit is formed separately from the first end cap and subsequently fastened to the first end cap. This can reduce the costs of manufacturing the first end cap, especially when the first end cap and flow conduit and formed by a moulding process. The interface between the inlet in the filter element and the flow conduit should form a fluid tight seal to ensure that all gas that flows through the flow conduit enters the filter element. Preferably, the flow conduit and the first end cap are formed form the same material. Preferably, the flow conduit can be fastened to the first end cap so that it can be subsequently removed. For example, preferably the flow conduit is fastened to the first end cap through the use of a mechanical fastening such as a latch, co-operating screw threads, or engaging bayonet formations. More preferably, the flow conduit and the inlet in the first end cap are shaped and sized so that the flow conduit is held within the end cap by the friction forces between the flow conduit and the first end cap.

Preferably, the flow conduit extends into the head part of the housing when the assembly is assembled. A seal can be provided in one or both of the surfaces of the housing and the flow conduit which contact one another. For example, a seal can be provided in a face of the flow conduit around the first conduit opening. The seal can be provided in a groove in that face. It can be provided as a separable component of the flow conduit. It might be formed as an integral part of the flow conduit, for example as a result of being formed by moulding in place. The material for seals in an assembly according to the invention will be selected according to the application for the assembly; the seal will generally be provided by an elastomeric material.

The head part can present a bore in which the end of the flow conduit is received. Preferably, the head part of the housing has internal walls which define a primary chamber within it which communicates with one of the ports and also with the hollow space within the tubular filter element. Generally, the axis of the port and the axis of the tubular filter element will not be aligned. Preferably, a seal is provided between the internal wall of the primary chamber at or towards the free end thereof and the flow conduit at the second conduit opening thereof. Preferably, the flow conduit extends from the hollow space into the primary chamber. It has been found the provision of a flow conduit that extends from the hollow space into the primary chamber can give rise to significant advantages, including that any turbulence in the flow of gas within the chamber between the port and the hollow space resulting from the non-alignment of the axes can be reduced. Further, such an assembly has fewer constraints on the design of the head part with a view to minimising flow resistance compared with other assemblies, such as that disclosed in PCT Application No. WO-02/38247. Details of a filter assembly having a primary chamber into which the flow conduit extends are disclosed in the co-pending PCT application filed with the present application which claims priority from UK Patent Application No. 0417458.7. Subject matter that is disclosed in that application is incorporated in the specification of the present application by this reference.

The flow conduit can be made with additional features during its manufacture. For example, a port might be formed in it for connection to means for indicating the pressure within the conduit. Such ports are known, for example as disclosed in PCT Application No. WO-A-99/30798. Details of an alternative arrangement for such a port are disclosed in the co-pending PCT application filed with the present application which claims priority from UK Patent Application No. 0417458.7. Subject matter that is disclosed in that application is incorporated in the specification of the present application by this reference.

The flow conduit can contain at least one vane positioned within it so that the flow of gas along the conduit between the first and second conduit openings passes over the vane and is smoothed by it. The provision of a vane in the flow conduit has been found to reduce the resistance to flow of gas through the flow conduit compared with a flow conduit which does not include a vane. This can enable the efficiency of a filter element to be enhanced compared with known assemblies of this general kind. Details of a filter assembly having a flow conduit which has a vane are disclosed in the co-pending PCT application filed with the present application which claims priority from UK Patent Application No. 0417464.5. Subject matter that is disclosed in that application is incorporated in the specification of the present application by this reference.

Preferably, the flow conduit contains at least two of the said vanes.

The flow conduit can be formed in first and second matable pieces, in which the first piece comprises a first part of the flow conduit wall and the vane, and the second piece comprises a second part of the flow conduit wall which has a recess formed in it in which the end of the vane that is remote from the first part of the conduit wall can be received when the first and second pieces are mated. Preferably, the first and second matable pieces of the flow conduit mate in a plane which contains the first and second conduit openings. Details of a filter assembly in which the flow conduit can be formed in first and second matable pieces is disclosed are disclosed in the co-pending PCT application filed with the present application which claims priority from UK Patent Application No. 0417464.5. Subject matter that is disclosed in that application is incorporated in the specification of the present application by this reference.

The part of the drainage layer between the second end cap and the housing can be compressed by at least one longitudinally extending fin. This can facilitate drainage of coalesced fluid from the drainage layer of the filter element, into a reservoir in the assembly from which it can be collected, for example for disposal. The effective engagement of the housing wall with the second end cap, through the fin and the drainage layer, can also help to locate the filter element in the housing transversely. This can facilitate the formation of a reliable seal between the housing and the filter element which might otherwise be disturbed if the element is able to move transversely within the housing. The transverse location of the element in the housing operates in conjunction with the axial location provided by the interengaging rib and groove.

The localised compression of the drainage layer by the fin needs to be sufficient so that the surface tension of liquid in the drainage layer is broken, and therefore the liquid is encouraged to drain from the drainage layer. Preferably, the thickness of the drainage layer is reduced in the region of localised compression by at least about 30%, more preferably, at least about 40%, especially at least about 50%.

Generally, the localised compression of the drainage layer will be not more than about 90%, preferably not more than about 75%, especially not more than about 60%.

Preferably, the angle between the fin and the axis of the housing is not more than about 45° When the fin extends at a non-zero angle to the housing axis, the fins will extend helically relative to the axis of the housing. Helical fins can have the advantage of providing contact with the drainage layer around more of the periphery of the element. It will often be preferred for the angle between the fins and the axis of the housing to be less than 45°, for example not more than about 30°, preferably not more than about 20°, especially less than about 10°, for example between 0° and about 5°. Drainage of liquid can be enhanced when the angle between the fins and the axis is small, especially when the fins extends approximately parallel to the axis of the housing, due to gravitational forces acting on draining liquid being greater.

The fin can be directed inwardly and act against (and contact, directly or indirectly) the external surface of the drainage layer. For example, the fin can be provided on the internal wall of the housing. The fin can be formed integrally with the wall of the housing, for example as a result of forming the housing by moulding (including casting).

The fin can be formed separately from the wall of the housing. This can be advantageous as it can aid assembly of the housing, especially when the housing includes a separate drain outlet located at its bottom end. For example, the fin can be provided as a separate component which can be placed in the housing. The separate fin element can be placed in the housing so that it rests against the wall of the housing. A recess can be provided in the wall of the housing to receive the separate filter element. Preferably, the separate filter element has a stand part towards its base which sits on the inner surface of the base of the housing when the filter element placed in the housing. However, the separate fin element having a stand part need not sit on the inner surface of the base of the housing. For example, the housing can be shaped and sized so that the separate filter element becomes wedged in the housing at a desired site, as the separate fin element is slid into the housing towards its site. In this arrangement preferably the stand part has a looped configuration, and the cross-sectional size of the housing decreases continuously along its length.

The fin can be provided on the second end cap. The fin can have a base part which connects the fin to the second end cap. When the element includes a flange for fastening the drainage layer (as discussed in more detail below), it can be preferred for the base part to connect the fin and the flange. The fin can be formed integrally with the second end cap, for example as a result of forming the housing by moulding (including casting). However, the fin can be formed separately from the housing and be fastened to the second end cap. This can be advantageous as the fin can be fastened to the second end cap after the drainage layer has been placed on the filter element. This can therefore ease assembly of the filter element.

A separate fin element can comprise a polymeric material. Preferred polymeric materials include polyolefins (especially polyethylene and polypropylene), polyesters, polyamides, polycarbonates and the like. Polymeric materials used for the separate fin component can be reinforced, for example by fibrous materials (especially glass fibres or carbon fibres). Materials other than polymeric materials can be used, for example metals.

Preferably a separate fin element can be formed by moulding, for example, by injection moulding.

Preferably, a separate fin element and the second end cap are formed from the same material.

The separate fin element can be fastened to the second end cap so that it can be subsequently removed. For example, the separate fin element can be fastened to the second end cap through the use of a mechanical fastening such as a latch, co-operating screw threads, or engaging bayonet formations. The separate filter element and second end cap can be shaped and sized so that the separate fin element is fastened to the second end cap by the frictional force between them.

It can be advantageous to fasten the separate fin element to the second end cap so that the separate fin element cannot subsequently be removed. In this case, preferably the separate fin element is fastened to the second end cap without the use of another material or component. For example, it can be preferred for the separate fin element to be fastened to the second end cap through the use of a welding technique, for example, ultrasonic or heat welding. However, it will be appreciated that the separate fin element can be fastened to the second end cap using another material such as a bonding agent, for example, an adhesive.

The fin can be directed outwardly, and act against (and contact, directly or indirectly) the internal surface of the drainage layer. For example, the fin can be provided on the second end cap of the element. The fin can be formed integrally with the element end cap, for example as a result of forming the housing by moulding (including casting).

Preferably, the drainage layer is compressed by at least two longitudinally extending fins, more preferably by at least four longitudinally extending fins, especially preferably at least five longitudinally extending fins, for example by six longitudinally extending fins. Preferably, the drainage layer is compressed by not more than 10 longitudinally extending fins, more preferably not more than 8 longitudinally extending fins, especially preferably not more than 7 longitudinally extending fins. The number of fins can be dictated by the size of the assembly. Typically, the larger the size of the filter assembly, the greater the number of fins.

Preferably, the fins are spaced apart around the filter element approximately uniformly. For example, when the filter element and housing are circular in cross-section, and when there are three fins, they can be spaced apart about 120E around the housing, or when there are four fins, they can be spaced apart about 90E around the housing.

Preferably, the edge of the fin which acts against the drainage layer directly or indirectly is generally rounded. This can provide line contact with the drainage layer (subject to compression thereof) which has been found to encourage drainage of coalesced liquid from the drainage layer.

Preferably, the fin is tapered, at least towards one end. This can facilitate assembly of the filter assembly, when the filter element is introduced into the housing.

Preferably, the length of the fin, measured from the second end of the filter element towards the first end thereof, is at least about 1.0 cm, more preferably at least about 1.5 cm, especially at least about 2.0 cm. Preferably, the length of the fin, measured from the second end of the filter element towards the first end thereof, is at most about 20.0 cm, more preferably at most about 15.0 cm, especially at most about 10.0 cm. When the fin is directed inwardly so that it acts against the external surface of the drainage layer, it is preferred that the fin extends in the direction from the first end of the element towards the second end, to a point which is beyond the second end. This can encourage drainage of coalesced liquid from the drainage layer.

Preferably, the ratio of the length of the fin, measured from the second end of the filter element towards the first end thereof to the length of the filter element is at least about 0.02, more preferably at least about 0.05, especially at least about 0.10, for example at least about 0.5. This can help to ensure that the fin will extend over as much of the drainage layer as will be impregnated with coalesced liquid when the assembly is in use.

Preferably, the ratio of the length of the fin, measured from the second end of the filter element towards the first end thereof to the length of the filter element is at most about 0.8, more preferably at most about 0.7, especially at most about 0.6. This can help ensure that the fin does not extend over parts of the drainage layer that will unlikely be impregnated with coalesced liquid when the assembly is in use. Further, this can help ensure that the fins not undesirably restrict the flow of gas around the space between the filter element and the housing.

Preferably, the inside of the housing is approximately circular in cross-section.

Preferably, the angle subtended at the centre of the housing by the or each fin is not more than about 10E, more preferably not more than about 5E, especially not more than about 3E.

Details of a filter assembly in which the part of the drainage layer between the second end cap and the housing are compressed by at least one longitudinally extending fin are disclosed in the co-pending PCT application filed with the present application which claims priority from UK Patent Application No. 0417459.5. Subject matter that is disclosed in that application is incorporated in the specification of the present application by this reference.

BRIEF DESCRIPTION OF THE DRAWINGS

Embodiments of the invention will now be described, by way of example only, and with reference to the accompanying drawings, in which:

FIG. 18b is a schematic perspective view of the second piece of the two piece flow conduit shown in FIG. 18a.

DETAILED DESCRIPTION OF THE PREFERRED EMBODIMENT

Figure 2:
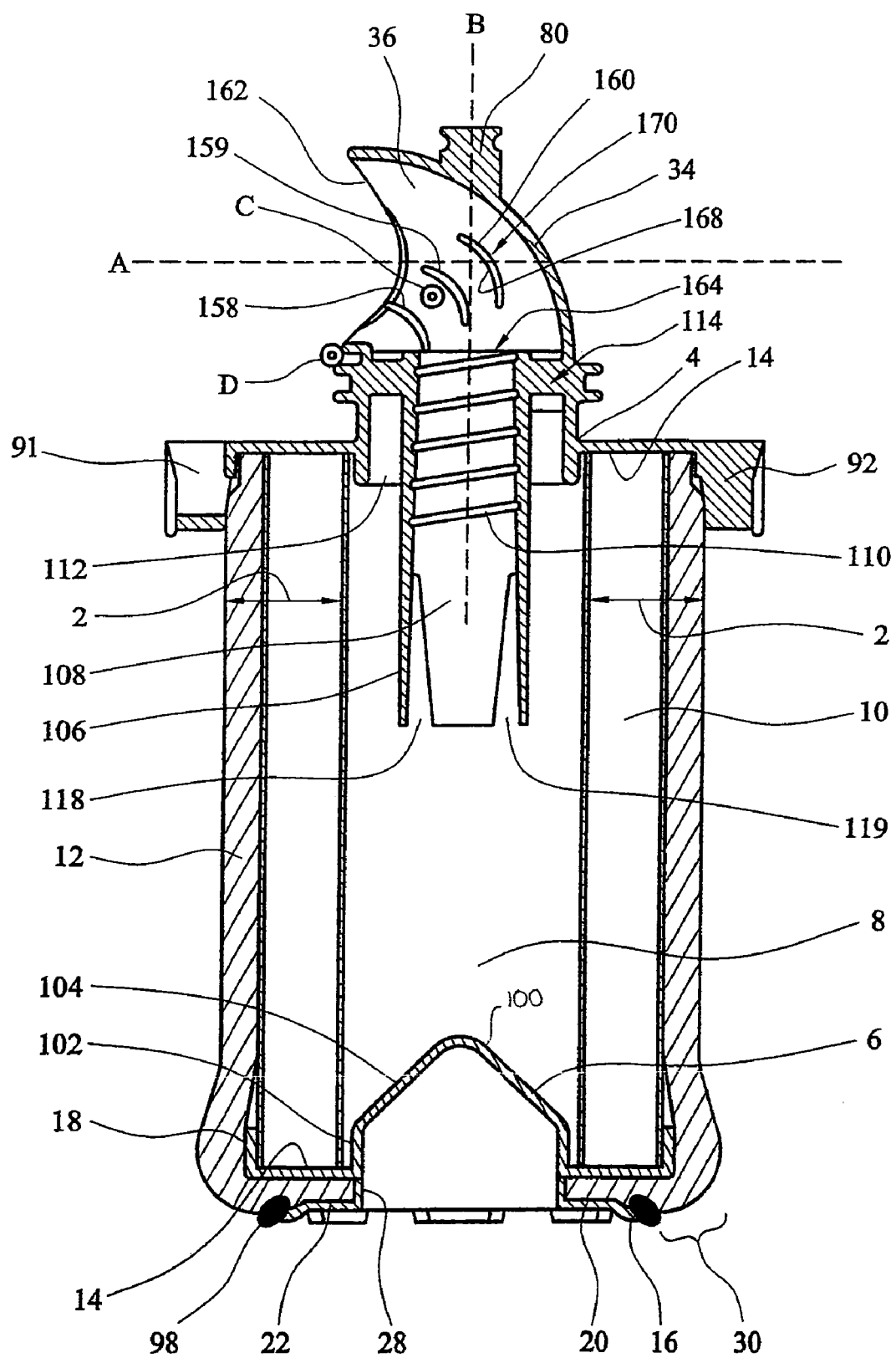
FIG. 2 is a sectional side elevation through a filter element according to the present invention.

Referring to the drawings, FIG. 2 shows a filter element which comprises a cylindrical wall section 2 formed from a filter medium, and top and bottom end caps 4 and 6.

The wall section 2 defines a hollow space 8 within it. The filter medium of the wall 2 comprises a cylindrical filtration layer 10 and a cylindrical anti-reentrainment layer or drainage layer 12 which fits snugly around the filtration layer on the outside of the filter element.

The top end cap 4 contains a flow conduit 34 which defines a flow path 36 for gas which is to be filtered. The flow conduit 34 has a port 80 in it for connection to a gauge for measuring the differential pressure across the filter element. When the filter element is located within a housing (described in more detail below) the port 80 can be received in a downwardly facing socket in the housing head, forming a seal by compression of an O-ring between the external surface of the port and the internal surface of the socket.

The flow conduit 34 has a first opening 162 having a first axis A, and a second opening 164 having a second axis B. The angle between the axes A, B of the first 162 and second 164 openings is 90°. The flow conduit 34 provides a continuous flow path between the two openings, and therefore provides a smooth change of direction for gas flowing therethrough when in use. The flow conduit 34 turns about an axis D which extends perpendicularly to the axes A, B of the first 162 and second 164 conduit openings. (As shown in FIG. 2, the axis D about which the flow conduit 34 turns extends perpendicularly to the plane along which the cross-section of FIG. 2 of the filter element is taken).

The flow conduit 34 contains first 158, second 159 and third 160 curved vanes extending perpendicularly across the flow conduit. Each vane curves around its own axis and the radius of curvature is the same for each vane. Further, the length of the vanes, measured between their leading and trailing edges, is the same for each vane. The axes around which the vanes curve extend perpendicularly to the axes A, B of the first and second conduit openings 162, 164. For example, as shown in FIG. 2, the second vane 159 curves around an axis C which extends parallel to the axis D about which the flow conduit 34 turns. The vanes each have concave 168 and convex 170 surfaces, wherein the concave surface of each vane faces the first 162 and second 164 openings of the flow conduit 34. Therefore, the vanes help guide the flow of gas between the first 162 and second 164 openings.

Figure 11:
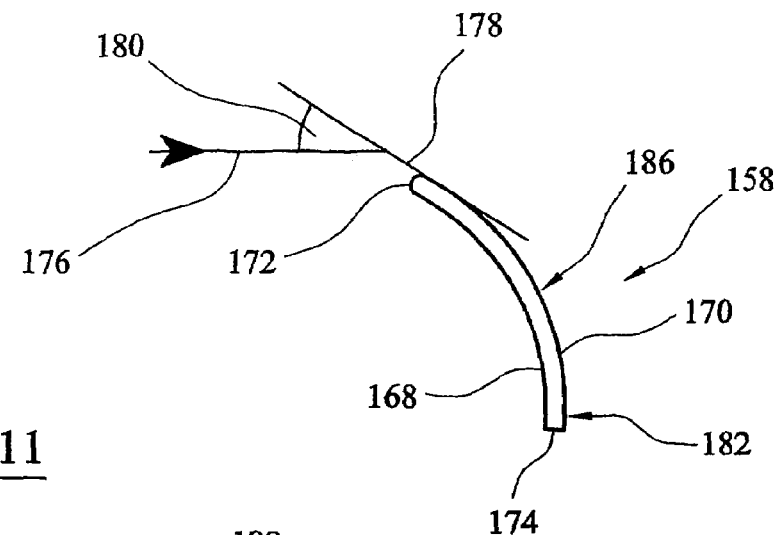
FIG. 11 is a sectional elevation of the first vane of the filter element shown in FIG. 2.

The shape and configuration of the first 158, second 159 and third 160 vanes is identical and shown in more detail with reference to the first vane 158 in FIG. 11. As shown, the first vane 158 has a rounded leading edge 172 which faces into the direction of the flow of gas 176 when the filter element is in use, and a trailing edge 174. The thickness of the first vane 158 is substantially constant between its leading and trailing edges. The vane has a straight portion 182 proximal its trailing edge 174, and a curved portion 186 extending between its leading edge and the straight portion. The length of the straight portion 182 is 5% of the total length of the vane 158 between its leading 172 and trailing 174 edges. The angle of incidence of the vane to the flow of gas when in use (i.e. the angle 180 between a straight line 176 projecting parallel to the direction of the flow of gas immediately upstream of the vane 158 and a straight line 178 projecting tangentially from the convex surface 170 of the vane at its leading edge 172) is 4°.

Figure 12:
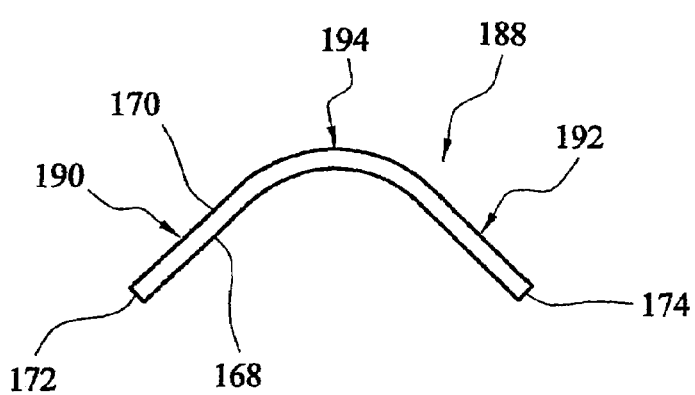
FIG. 12 is a sectional elevation of the first vane of the filter element shown in FIG. 2 according to a second embodiment.

The first 158, second 159 and third 160 vanes need not have the shape and configuration of the vane shown in FIG. 11. For example, the vanes can have the shape and configuration of an elbow shaped vane 188 as shown in FIG. 12. The elbow shaped vane 188 is substantially similar in configuration to that shown in FIG. 11 and like parts share like reference numerals. However, the elbow vane 188 has a straight leading portion 190 proximal its leading edge 172, as well as a straight trailing portion 192 proximal its trailing edge 174 and a curved portion 194 between them.

Figure 13:
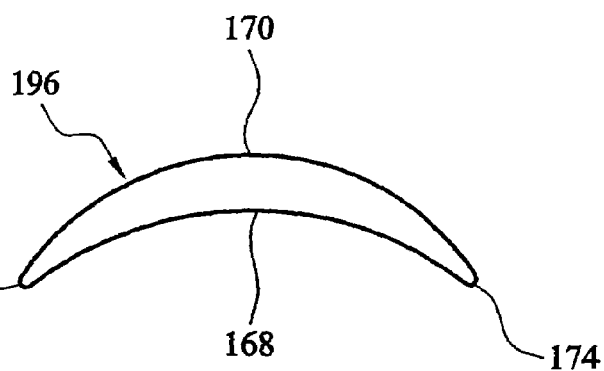
FIG. 13 is a sectional elevation of the first vane of the filter element shown in FIG. 2 according to a third embodiment.

Further, the first 158, second 159 and third 160 vanes can have the shape and configuration of the crescent shaped vane 196 shown in FIG. 13. The crescent shaped vane 196 is substantially similar in configuration to that shown in FIG. 11 and like parts share like reference numerals. However, the thickness of the crescent shaped vane 196 is not uniform between its leading 172 and trailing edges 174. Instead, the thickness of the crescent shaped vane 196 continuously increases as you travel from its leading edge 172 towards the midpoint between the leading and trailing 174 edges, and continuously decreases as you travel from the midpoint to the trailing edge.

Figure 14:
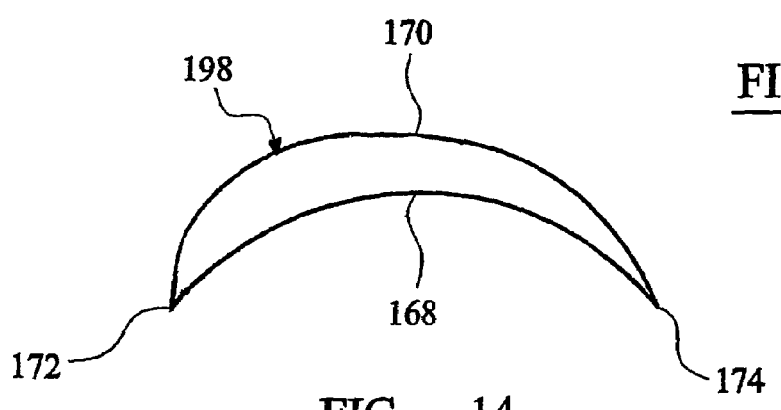
FIG. 14 is a sectional elevation of the first vane of the filter element shown in FIG. 2 according to a fourth embodiment.

Further still, the first 158, second 159 and third 160 vanes can have the shape and configuration of the curved-aerofoil shaped vane 198 shown in FIG. 14. The curved-aerofoil shaped vane 198 is similar in configuration to that shown in FIG. 11 and like parts share like reference numerals. However, the thickness of the curved-aerofoil shaped vane 196 is not uniform between its leading 172 and trailing 174 edges and is generally thicker towards its leading edge than towards its trailing edge.

Referring now back to FIG. 2, the gap/chord ratio of the first 158, second 159 and third 160 vanes shown in FIG. 2, is 0.45.

The first 158, second 159 and third 160 vanes are arranged such that radius ratio of all of the sub-flow conduits (described in more detail below in relation to FIG. 17) is at least 1.

The first 158, second 159 and third 160 vanes are arranged such that aspect ratio for all the sub-flow conduits is at least 1.

Figure 15:
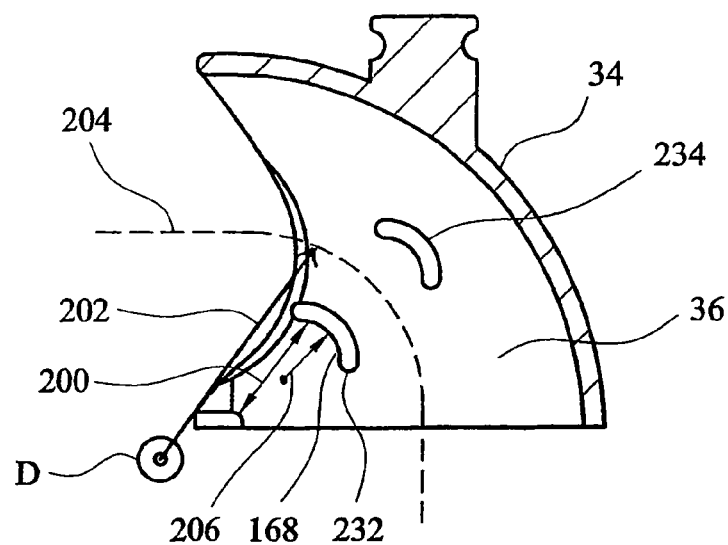
FIG. 15 is a sectional elevation view of a flow conduit according to the invention illustrating the calculation of the position of the first vane.
Figure 16:
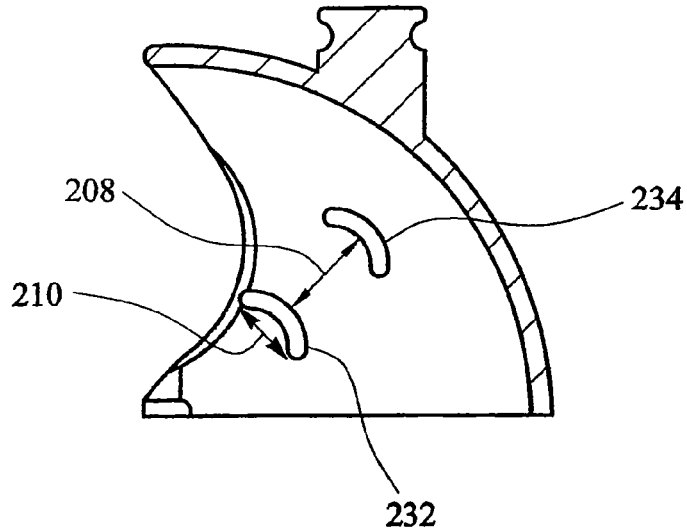
FIG. 16 is a sectional elevation view of the flow conduit shown in FIG. 15 illustrating the calculation of the gap/chord ratio of the vanes.
Figure 17:
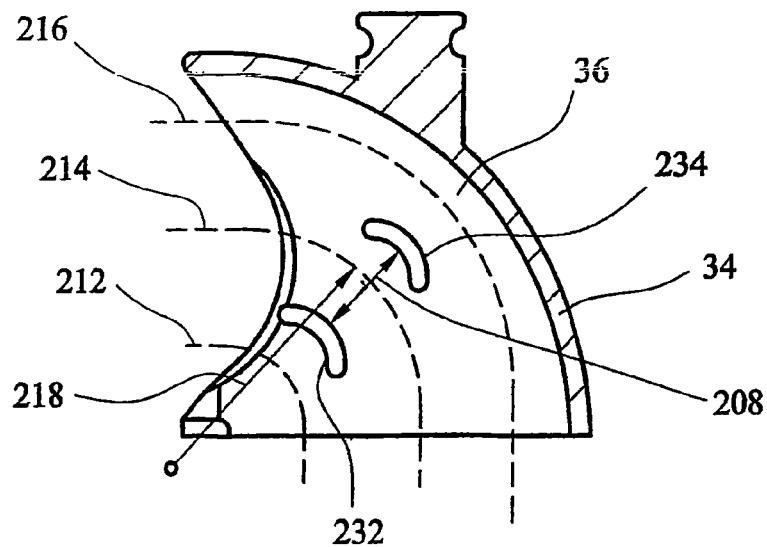
FIG. 17 is a sectional elevation view of the flow conduit shown in FIG. 15 illustrating the calculation of the radius ratio and the aspect ratio of the sub-flow conduits defied by the vanes.

FIGS. 15 to 17 illustrate how the preferred distance between the concave surface of the inner most vane and wall of the flow conduit the concave surface of the vane faces, the gap/chord ratio, and the radius ratio and aspect ratio for a flow conduit with vanes, can be calculated. For sake of simplicity of illustration, the flow conduits 34 of FIGS. 15 to 17 contain only a first vane 232 and a second vane 234. Otherwise, all other parts of the flow conduit 34 of FIG. 15 are the same as that shown in FIG. 2 and share the same reference numerals.

As illustrated in relation to FIG. 15, the preferred positioning of the inner most vane (i.e. the first vane 232) can be calculated so that the distance 200 between its concave surface 168 and wall of the flow conduit the concave surface of the vane faces, is equal to: $R - r \cos \theta/2$, where (R) is the radius of the curvature 202 of the centre line 204 of the turn of the flow conduit 34, (r) is the radius of the curvature 206 of the first vane 232, and θ is the angle between the axes of the first 162 and second 164 conduit openings (i.e. 90° as shown in FIGS. 2 and 15).

As illustrated in relation to FIG. 16, the gap/chord ratio is calculated as the ratio of the distance 208 between the midpoints of the first 232 and second 234 vanes, and the chords 210 of the vanes.

As illustrated in relation to FIG. 17, the first 232 and second 234 vanes divide the flow conduit 34 into first, second and third sub-flow conduits having first 212, second 214 and third 216 centre line of turns respectively. The radius ratio of the second sub-flow conduit having a centre line of turn 214, is calculated as the ratio of the radius of the curvature 218 of the centre line of the turn 214 of the second sub-flow conduit to the width 208 of the sub-flow conduit measured between the first 232 and second 233 vanes.

Figure 4:
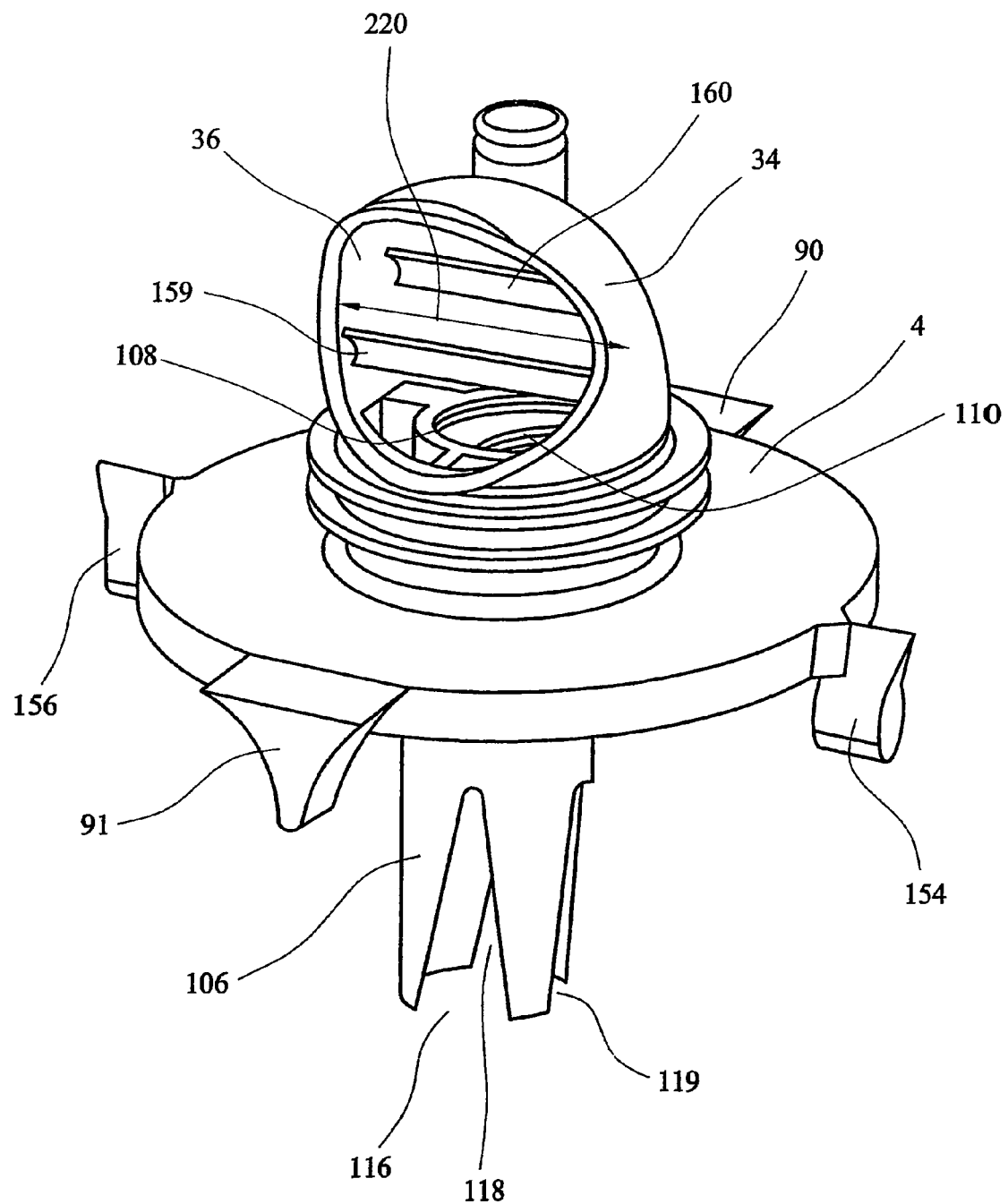
FIG. 4 is a schematic perspective view of the top end cap of the filter element shown in FIG. 2.

Still referring to FIG. 17, the aspect ratio of the second sub-flow conduit having a centre line of turn 214 is calculated as the ratio of the depth of the second sub-flow conduit to the width 208 of the second sub-flow conduit measured between the vanes. As shown in FIG. 4, the depth of a sub-flow conduit is the distance 220 between the opposing walls of the flow conduit 34 between which the vanes that define the sub-flow conduit extend.

Referring now to FIG. 2, the flow conduit 34 and the top end cap 4 of the filter element are formed as separate pieces. Further, the flow conduit 34 is formed from two pieces.

Figure 18A:
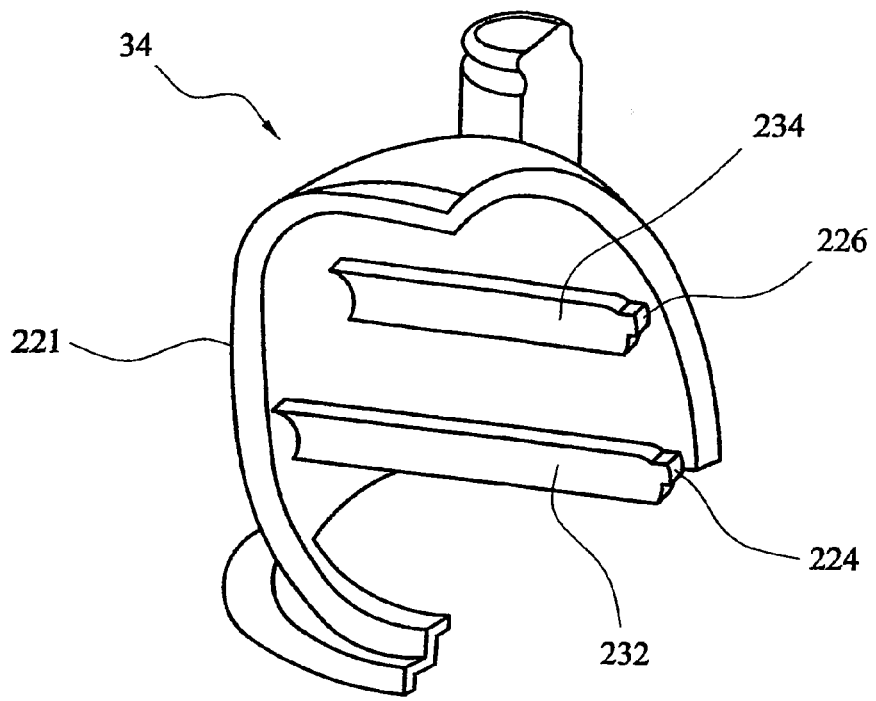
FIG. 18a is a schematic perspective view of the first piece of a two piece flow conduit according to the invention.
Figure 18B:
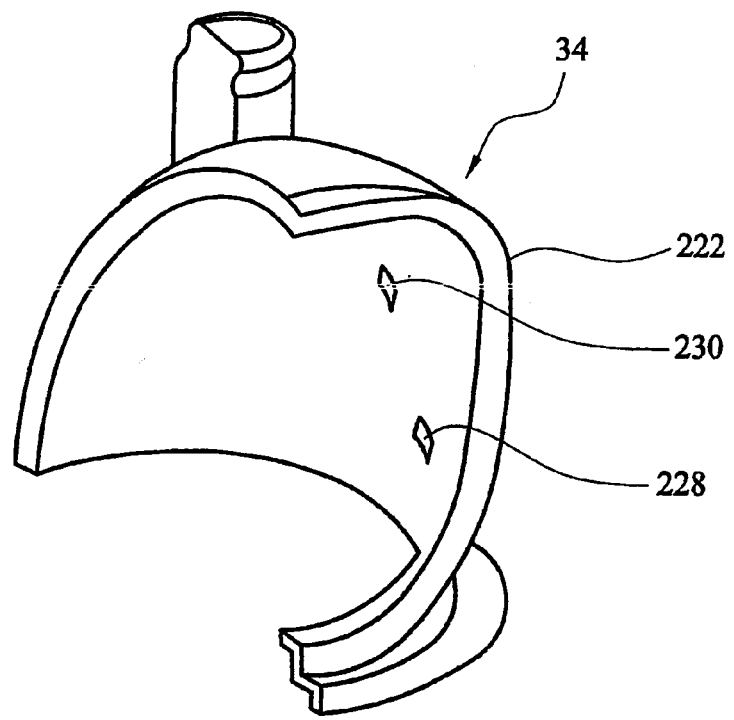

A two piece flow conduit 34 is shown in FIGS. 18a and 18b. For sake of simplicity, the flow conduit 34 of FIGS. 18a and 18b contains only a first vane 232 and a second vane 234. Otherwise, all other parts of the flow conduit 34 of FIG. 15 are the same as that shown in FIG. 2 and share the same reference numerals. With reference to FIGS. 18a and 18b, the flow conduit 34 comprises first 221 and second 222 matable pieces. The first 221 and second 222 pieces are mirror images of each other (the plane of symmetry of the pieces extending through both the axes of the first 162 and second 164 conduit openings) except that the first 232 and second 234 vanes extend from, and are part of, the first piece 221 of the flow conduit 34. The first 232 and second 234 vanes have respective tangs 224, 226 at their free ends (i.e. the ends distal to the wall of the first piece 220 from which the vanes extend) that can be received within corresponding recesses 228, 230 formed in the wall of the second piece 222 of the flow conduit 34. Therefore, when the first 221 and second 222 pieces are brought together to form the flow conduit 34, the tangs 224, 226 are received within the corresponding recesses 228, 230 so that the first 232 and second 234 vanes are secured to the second piece 222 at their free ends.

Referring back to FIG. 2, the top end cap 4 further comprises an inlet tube 106, co-axial with the top end cap 4, which extends from the second conduit opening 164 of the flow conduit 34 part way into the hollow space 8 to a downstream open end. In this embodiment, the inlet tube 106 and top end cap 4 are one piece. However, it will be appreciated that they need not be one piece. The inlet tube 106 defines a flow path 108 for gas which is to be filtered and is in fluid connection with the flow path 36 of the top end cap 4.

The top end cap 4 has annular opening 112 extending around the inlet tube 106 proximal to the flow conduit 34. The inlet tube 106 is held within the annular 112 opening by fins 114 that extend between the top end cap 4 and the inlet tube 106.

Figure 3:
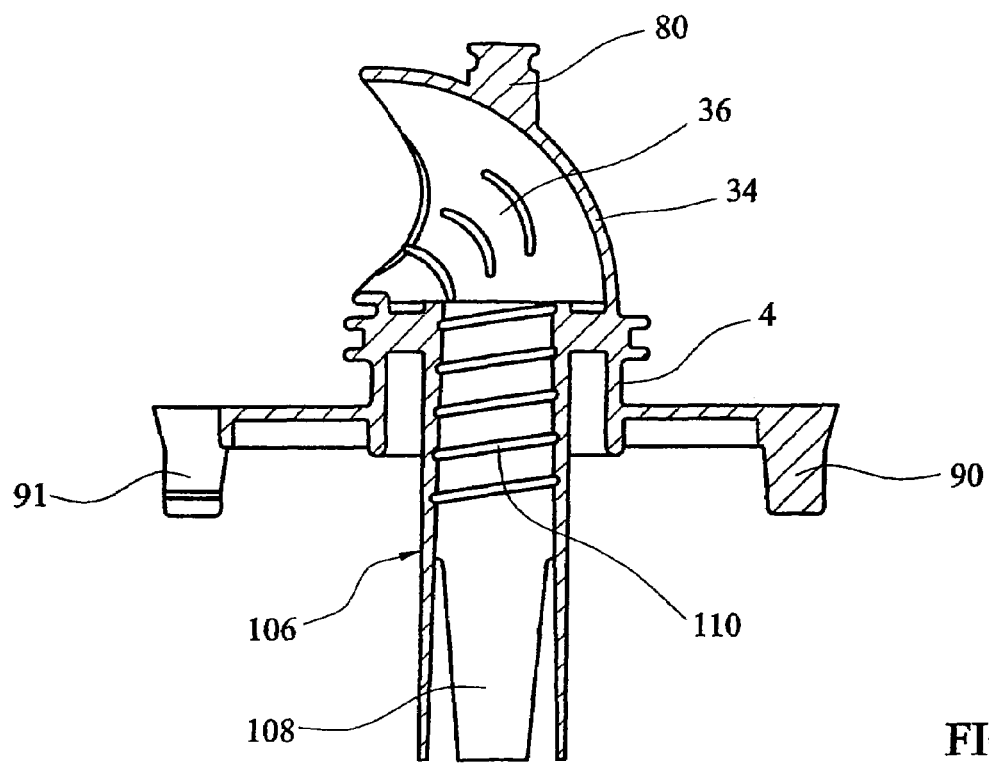
FIG. 3 is a sectional side elevation of the top end cap of the filter element shown in FIG. 2.

As best shown in FIG. 3, the inlet tube 106 has a rifling formation defined on its inner wall, extending from its end proximal to the top end cap 4, part way towards its end distal to the top end cap. The rifling formation is provided by a helically extending ridge 110 on the inner wall of the inlet tube 106.

Referring now to FIG. 4, a schematic perspective view of the top end cap 4 of FIG. 2 is shown. For simplicity and to enable illustration of the helically extending groove 110, the first vane 158 is not shown. As shown, the inlet tube 106 has first 116, second 118, third 119 and fourth (not shown) openings in its side wall. The openings are in the form of slits that taper uniformly from an open end at the downstream open end of the inlet tube 106, to a point towards the upstream open end of the inlet tube. Therefore, the proportion of the side wall of the inlet tube 106 that is open, increases towards the downstream open end of the inlet tube. The slits extend along 50% of the length of the inlet tube and in a direction parallel to the axis of the inlet tube. The slits are positioned equally around the inlet tube 106, i.e. they are spaced apart from each other by about 90° around the inlet tube.

FIGS. 6 to 10 show alternative embodiments of inlet tubes according to the invention that can be used with the top end cap 4 of FIG. 2. The top end caps 4 shown in FIGS. 6 to 10 are the same as that shown in FIG. 2. However, for simplicity, the first 158, second 159 and third 160 vanes, and also the helically extending ridge 110, are not shown.

Figure 6:
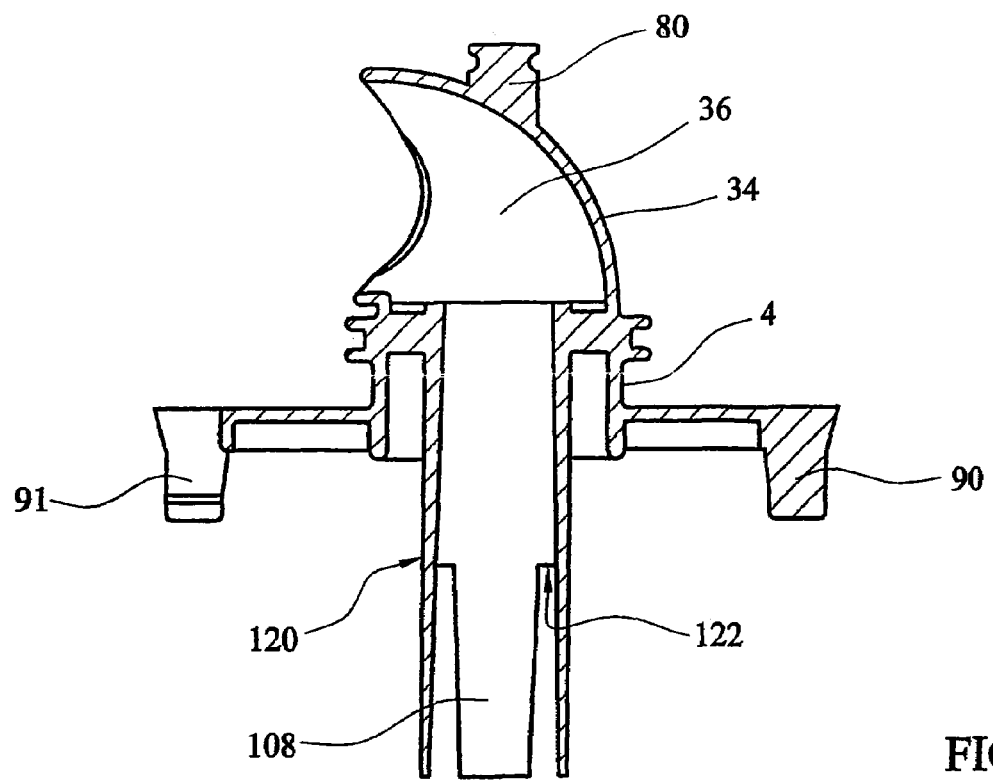
FIG. 6 is a schematic sectional elevation of the top end cap of the filter element shown in FIG. 2 illustrating a second embodiment of the inlet tube of the filter element.

FIG. 6 shows an inlet tube 120 according to the invention which is similar in configuration to that shown in FIG. 2, except that the first, second, third and fourth slits taper to a flat end 122, instead of to a point.

Figure 7:
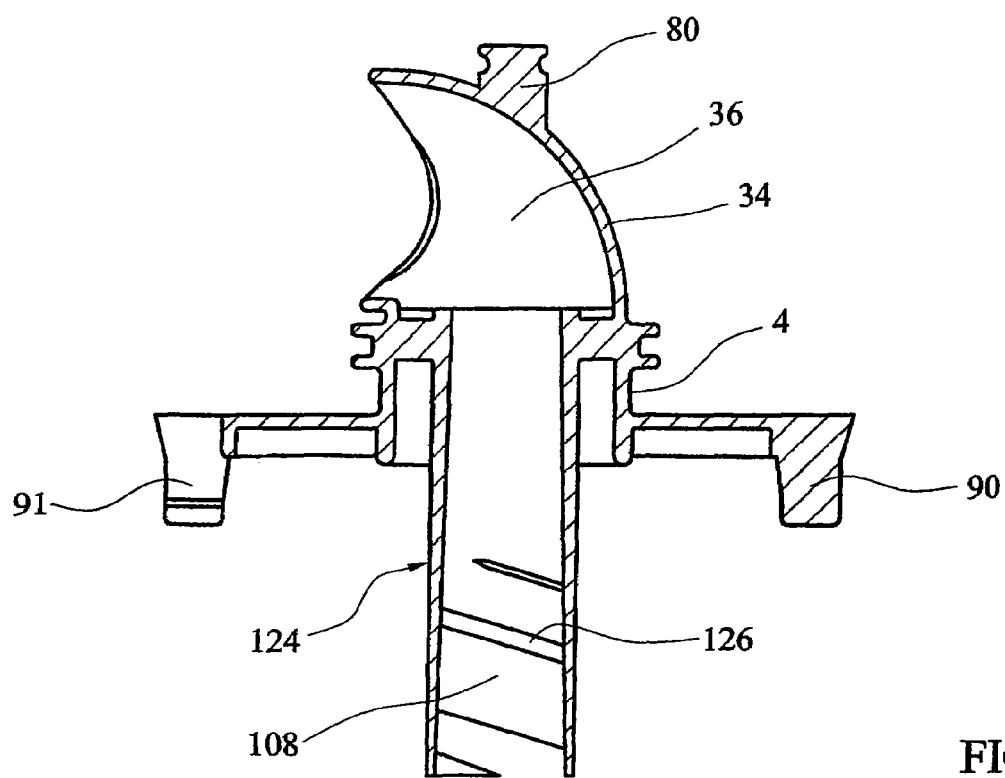
FIG. 7 is a schematic sectional elevation of the top end cap of the filter element shown in FIG. 2 illustrating a third embodiment of the inlet tube of the filter element.

FIG. 7 shows an inlet tube 124 which is similar in configuration to that shown in FIG. 2, except that the inlet tube 124 only has one opening 126, which is in the form of a helically extending slit. The helically extending slit extends from an open end at the downstream open end of the inlet tube 124, to a point towards the upstream open end of the inlet tube. As shown, the angle between the plane perpendicular to the axis of the inlet tube 124 and a straight line projecting substantially along a portion of the slit 126 is constant. However, the width of the helically extending slit 126, taken perpendicular to the straight line projecting substantially along a portion of the slit, decreases towards the upstream open end. Therefore, the proportion of the side wall of the inlet tube 124 that is open, increases towards the downstream open end of the inlet tube.

Figure 8:
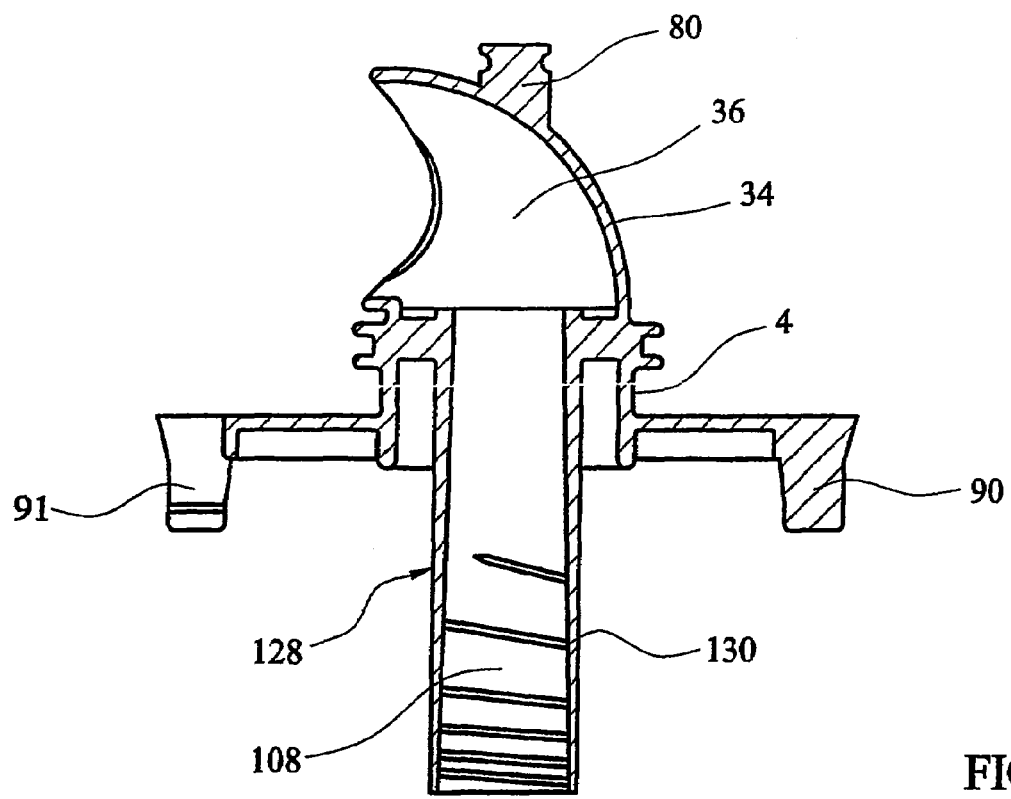
FIG. 8 is a schematic sectional elevation of the top end cap of the filter element shown in FIG. 2 illustrating a fourth embodiment of the inlet tube of the filter element.

FIG. 8 shows an inlet tube 128 which is similar in configuration to that shown in FIG. 7 in that the inlet tube 128 only has one opening 130 in the form of a helically extending slit. However, in contrast to the inlet tube 124 shown in FIG. 7, the width of the slit 130 shown in FIG. 8 in constant along its entire length. Further, the angle between the plane perpendicular to the axis of the inlet tube 128 and a straight line projecting substantially along a portion of the slit 130 decreases towards the downstream open end of the inlet tube. Therefore, the proportion of the side wall of the inlet tube 128 that is open, increases towards the downstream open end of the inlet tube.

Figure 9:
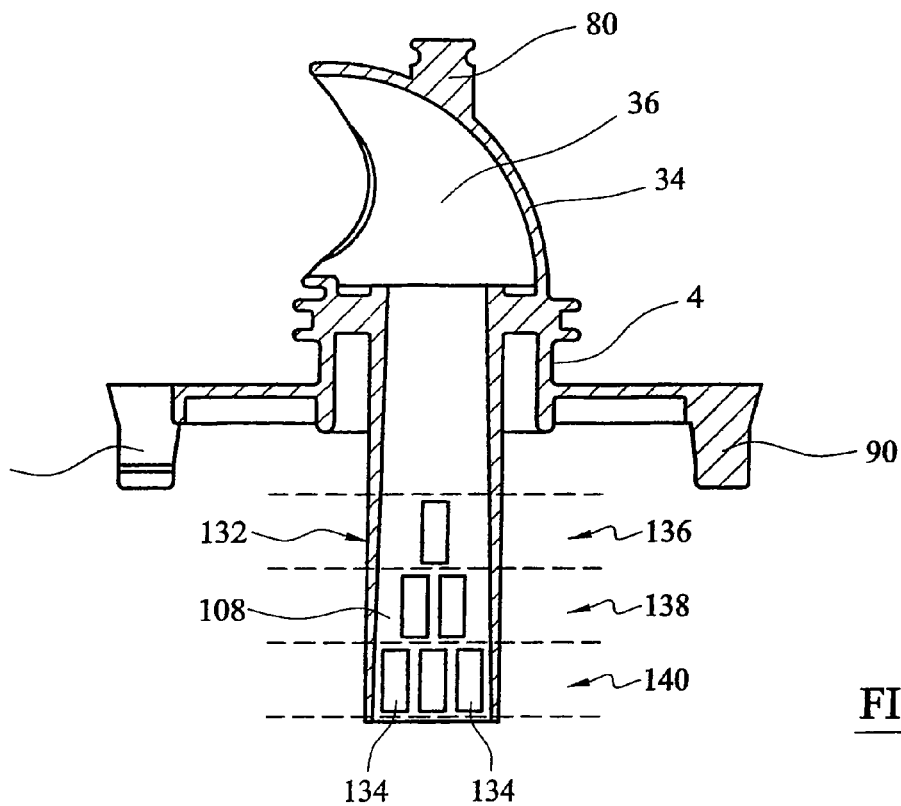
FIG. 9 is a schematic sectional elevation of the top end cap of the filter element shown in FIG. 2 illustrating a fifth embodiment of the inlet tube of the filter element.

FIG. 9 shows an inlet tube 132 which is similar in configuration to that shown in FIG. 2, except that the side wall has a plurality of openings 134 in the form of apertures. The apertures can be identified as wholly falling within three bands (an upstream band, designated generally by 136, a middlestream band 138, and a downstream band 140), extending around the inlet tube, each band defining a plane perpendicular to the axis of the inlet tube. The upstream band 136 is located within the downstream half of the inlet tube 132. Four apertures (only one of which can be seen in FIG. 9) are present in the upstream band 136, eight apertures (only two of which can be seen in FIG. 9) are present in the middlestream band 138, and twelve apertures (only three of which can be seen in FIG. 9) are present in the downstream band 140. The apertures have two equal length, straight, parallel sides, and a convex end at each end of the aperture that extends between the parallel sides. The length of the parallel sides is longer than the transverse distance between them. All of the apertures 134 are equal in shape and dimension.

The four apertures in the upstream band 136 are positioned equally around the inlet tube 132, i.e. they are spaced apart from each other by about 90° around the inlet tube. The eight apertures in the middlestream band 138 are divided into four sets of two apertures. The four sets of two apertures are positioned equally around the inlet tube 132, i.e. they are spaced apart from each other by about 90° around the inlet tube. The twelve apertures in the downstream band 140 are divided into four sets of three apertures. The four sets of three apertures are positioned equally around the inlet tube 132, i.e. they are spaced apart from each other by about 90° around the inlet tube. Therefore, the proportion of the side wall of the inlet tube 132 that is open increases towards the downstream open end of the inlet tube.

Figure 10:
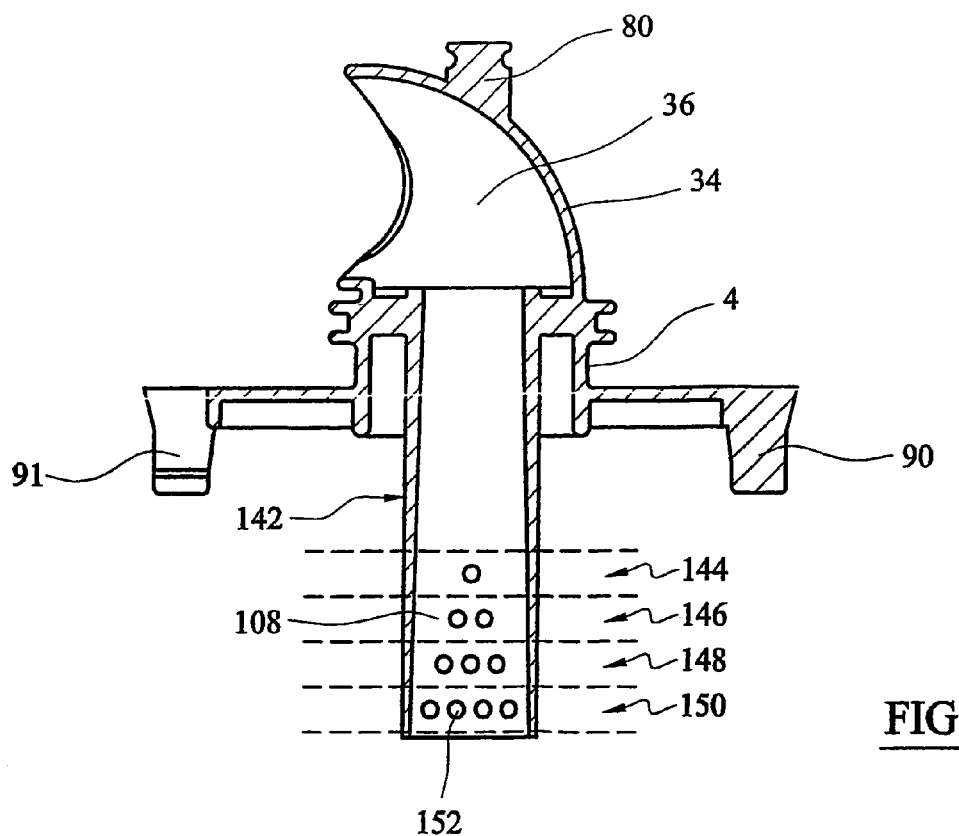
FIG. 10 is a schematic sectional elevation of the top end cap of the filter element shown in FIG. 2 illustrating a sixth embodiment of the inlet tube of the filter element.

FIG. 10 shows an inlet tube 142 which is similar in configuration to that shown in FIG. 9, except that the apertures 152 are circular in shape, and that four bands (an upstream band, designated generally by 144, an upstream middlestream band 146, a downstream middlestream band 148, and a downstream band 150) can be identified instead of three. Four apertures (only one of which can be seen in FIG. 10) are present in the upstream band 144, eight apertures (only two of which can be seen in FIG. 10) are present in the upstream middlestream band 146, twelve apertures (only three of which can be seen in FIG. 10) are present in the downstream middlestream band 148, and sixteen apertures (only four of which can be seen in FIG. 10) are present in the downstream band 150.

Referring back to FIG. 2, each of the end caps has a trough 14 formed in it. The top part of the filtration layer 10 and the drainage layer 12 are retained and sealed in the trough 14 of the top end cap 4, and the bottom part of the filtration layer is retained and sealed in the trough 14 of the bottom end cap 6.

The bottom end cap 6 further comprises a flange part 16, spaced apart from the surface 20 of the second end cap facing away from the top end cap 4. The flange part 16 extends generally transverse to the axis of the filter element. The flange part 16 is located centrally with respect to the bottom end cap 6, and is spaced from it by a co-axial stem 28 extending between them. The flange part 16 and second end cap 6 between them define an annular slot 22, in which the drainage layer can be received. The slot is tapered inwardly so that the distance between the flange and the surface of the end cap decreases progressively. The slot is therefore generally V-shaped when the end cap is viewed from one side.

The bottom part of the drainage layer 12 is wrapped over the wall 18 of the trough 14 of the bottom end cap 6 and folded under its bottom surface 20, in the annular slot 22 between the second end cap 6 and the flange part 16. The drainage layer 12 is fastened in the space 22 by means of a loop of elastic material 98, such as an elastic band or O-ring, which can be stretched to fit over the flange. The loop 98 is sized so that it is pinched between the opposing surfaces of the slot and the drainage layer: the transverse dimension of the material of the loop is slightly greater than the distance between the drainage layer and the opposing surface of the slot when the loop the tension in the loop (resulting from stretching it to fit it over the flange) is relaxed. This causes the loop and the drainage layer to be compressed slightly, so that the drainage layer is gripped in the annular slot. The diameter of the flange is smaller than the diameter of the end cap so that at least a part 30 of the drainage layer 12 folded over the bottom surface 20 is exposed.

The bottom end cap 6 also has a central upstand portion 100. The central upstand portion 100 extends from the bottom of the hollow space defined by the bottom end cap 6 towards the first end cap. The central upstand portion 100 has a generally cylindrical base 102, and a generally conical part 104 extending from the base toward the first end cap 4. The diameter of the cylindrical base 102 is the same as that of the stem 28.

Figure 1:
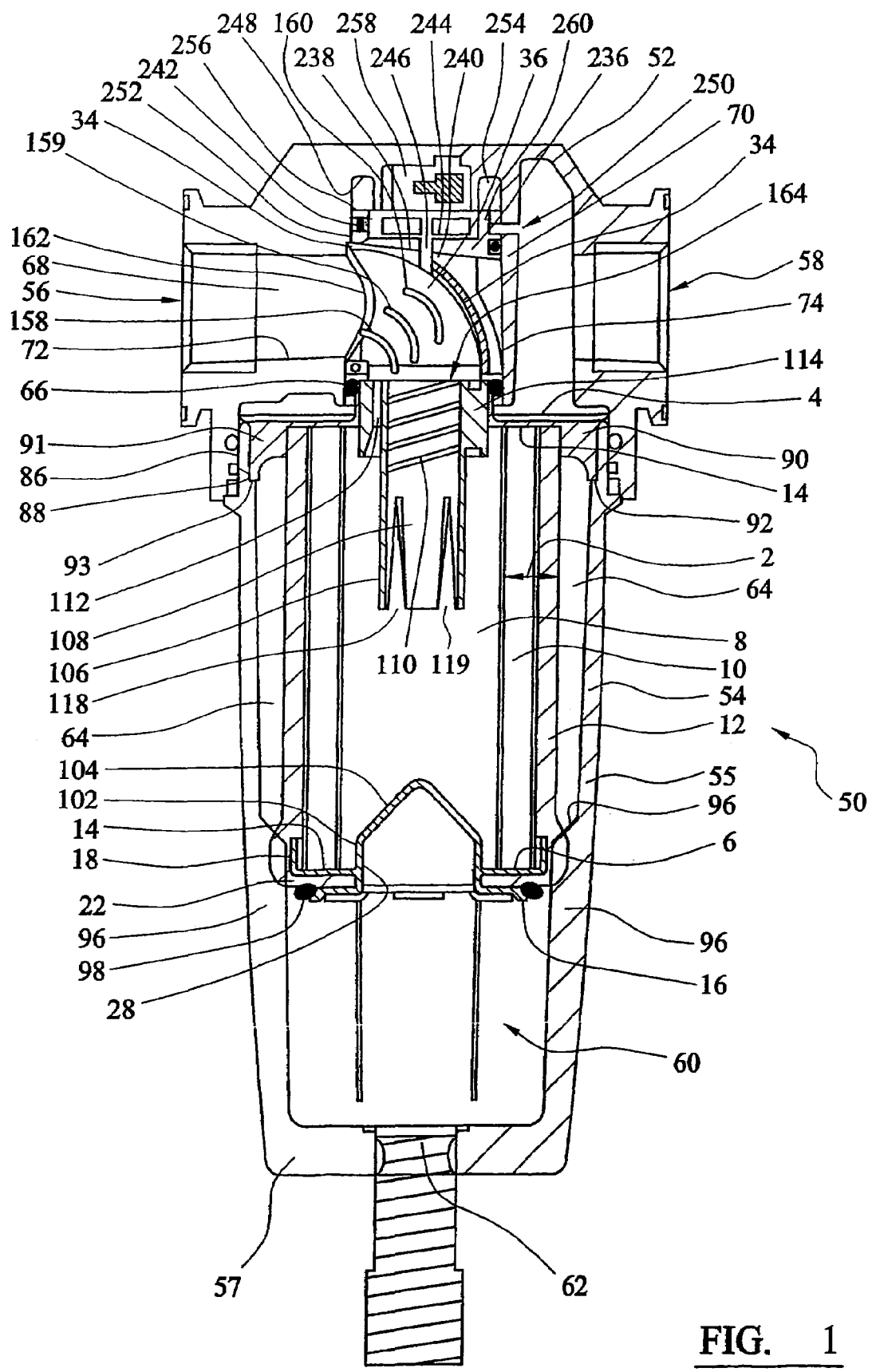
FIG. 1 is sectional side elevation through a filter assembly according to the present invention which comprises a filter element and the housing in which the element is located when in use.

Referring now to FIG. 1, an assembly according to the present invention is shown which includes a housing 50 in which the filter element shown in FIG. 2 can be located when in use. However, as shown, an alternative embodiment of a filter element which is substantially the same as that shown in FIG. 2, is located within the housing.

The filter element shown in FIG. 1 is substantially the same as that shown in FIG. 2, except that an extension 236 is provided on the external wall of the flow conduit 34 and extends away from the second conduit opening 164, instead of the port 80 for connection to a gauge. The extension 236 has seating portion 238 having a generally circular cross-section, and a fin 240 having a generally planar configuration which extends between the seating portion 238 and the flow conduit 34. The seating portion 238 provides a generally flat surface 244 and a wall 256 which extends around the periphery of the surface and away from the second conduit opening 164. A differential pressure measuring device (discussed in more details below) can be received by and contained within the area defined by the surface 244 and wall 256 of the seating portion. The extension 236 is configured so that the axis of the circular seating portion 238 is angled relative to the axis of the second conduit opening 164 by 5°. Therefore, as shown in FIG. 1, when viewed in cross-section, the seating portion 238 appears slanted relative to the filter element. A groove 242 that is capable of receiving an O-ring is formed around the periphery of the wall 256. A vent 246 that extends between the flow path 36 of the flow conduit 34 and the surface 244 of the seating portion 238 is formed within the extension 236.

The housing comprises a head 52 and a body 54 which can be connected to one another by means of cooperating screw threads (as is well established) at their interfaces 86, 88. The head and body are formed from a metallic material, especially aluminium or an alloy thereof. They can be formed by machining, or by techniques such as casting.

The housing body comprises a cylindrical wall 55, an end wall 57 at one end of the internal wall, and an open end at the opposite end of the cylindrical wall. The housing body defines a space within which the filter element is coaxially located when in use. Liquid drops which drain from the drainage layer are collected in a reservoir 60 in the housing body. The housing includes a drain outlet 62, for example of the kind which is disclosed in EP-A-81826.

Figure 5:
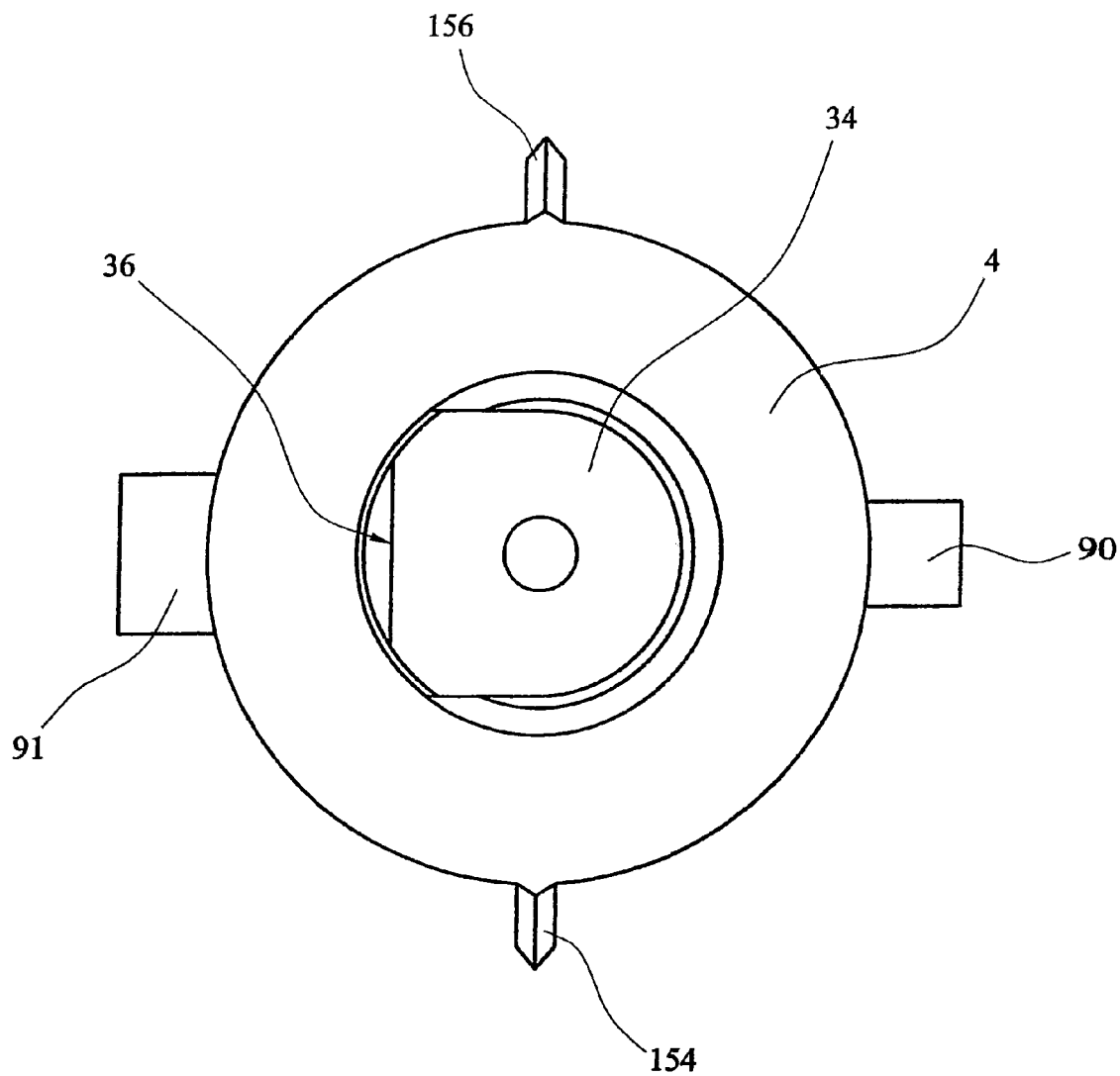
FIG. 5 is a schematic top view of the top end cap of the filter element shown in FIG. 2.

The filter element fits on to the housing body by means of inter-engaging formations in the form of ribs and grooves. The top end cap 4 has first 90, second 91, third 154 and fourth 156 ribs (for example as shown in FIGS. 4 and 5) around its perimeter that extend from the top end cap towards the bottom end cap, on the exterior of the filter element. The four ribs are spaced apart about 90° around the top end cap. Further, the first 90 and second 91 ribs are spaced about 180° around the top end cap. The first 90 and second 91 ribs are received in the housing body by means of correspondingly shaped and positioned first 92, second 93, grooves provided in the interior of the housing body at the open end.

The third and fourth ribs 154, 156 are identical in shape size and configuration. The leading edge of the third and fourth ribs 154, 156 (which is directed into the gas stream) is rounded and the trailing edge of the rib is tapered inwardly, towards (optionally to) a sharp edge or point. These ribs 154, 156 are approximately aerofoil-shaped when viewed in cross-section (perpendicular to the axis of the assembly). This shape gives minimal resistance to the flow of gas past the ribs. In contrast to the first 90 and second 91 ribs, there are no corresponding grooves for the third 154 and fourth 156 ribs. Instead, the axial faces of the third 154 and fourth 156 ribs match the profile of the housing body so that they rest against the body when the filter element has been fitted within the housing body.

The first and second ribs 91, 90 are shaped differently to that of third and fourth ribs 154, 156. The leading edge of the first and second ribs 90, 91 are rounded, and the trailing end is flared outward from the rounded leading edge. The first and second ribs 90, 91 have an approximately tapered "V" shape when viewed in cross-section (perpendicular to the axis of the assembly) with a flat top surface extending between the ends of the "V".

As can be seen in FIG. 1, the second rib 91 is located under the internal cylindrical wall 72 of the head 52 of the housing 50 (discussed in more detail below). Therefore, when the filter assembly is in use, the tapered sides of the second rib 91 aids the flow gas around the internal cylindrical wall 72, and towards the outlet port 58. The first rib 90 is located below the output port 58. Therefore, in order to minimise the direction of gas away from the output port, the width of the first rib 90 at its widest point is smaller than that of the second rib 91. Further, due to the first rib 90 and its corresponding first groove 92 being narrower than the second rib 91 and its corresponding second groove 93, the filter element can only be inserted into the body in one orientation. This can ensure that when the housing is assembled, the inlet port 56 of the housing head 52 (described in more detail below) is aligned with the flow conduit 34 of the top end cap 4, rather than incorrectly aligned with the outlet port 58 of the housing head. This is especially true when the housing head and body are configured so that they can only fit together in one orientation. This can be achieved by providing a single start screw thread at the interfaces 86, 88 of the housing head and body.

The filter element is assembled in the housing body by locating the first and second ribs 90, 91 with the first and second grooves 92, 93 of the housing body 54, and then sliding the ribs into the grooves until they sit on the bottom of the grooves. Once the ribs have been fully received by the grooves, the filter element is securely suspended within the housing body. Therefore, as will be appreciated, the axial position of the filter element within the housing body can be controlled by the shape and size of the ribs and grooves. Further, rotation of the filter element relative to the housing body is inhibited by the interlocking of the ribs with the grooves.

Once the filter element is appropriately assembled in the housing body, an annular space 64 is defined between the filter element and the housing. The filter element can be removed from the housing body 54, by pulling the filter element away from the housing body along its axis.

The housing body 54 has two a plurality of fins 96 extending along the cylindrical wall 55, parallel to the axis of the housing body. The number of fins 96 provided on the cylindrical wall 55 of the housing body 54 can depend on the size of the housing body. For example, in general, the larger the housing body, the greater the number of fins 96 provided. Typically, the minimum number of fins 96 provided will be two. In the embodiment shown, the housing body has six fins 96, however, only two are shown. The fins extend from the end wall 57 of the housing body towards the open end, and are spaced uniformly around the cylindrical wall 55 of the housing body 54. When the filter element is assembled in the housing body so that the ribs have been fully received within the grooves, the part of the drainage layer 12 which extends over the bottom end cap 6 is compressed between the bottom end cap and the edge of the fins 96. Accordingly, the transverse position of the filter element within the housing body can be controlled by the shape and size of the fins. The cross-section of the edge of the fins which contacts the drainage layer, taken perpendicular to the length of the ridge, is a rounded convex shape. As a result of the local compression of the drainage layer between the fins and the second end cap, liquid collected in the drainage layer is encouraged to drain from it, along each fin.

The housing head includes an inlet port 56 which communicates with the flow conduit 34 on the top end cap 4 through a transversely extending primary chamber 68 within the housing head. The primary chamber 68 is defined by an internal cylindrical wall 72 extending transversely within the housing head, and an internal end wall 70 opposite the inlet port 56. The internal cylindrical side wall 72 and end wall 70 are integral to the housing head. A first circular aperture 74, coaxial with the housing head, is defined within the part of side wall of the inlet conduit that is proximal to the filter element when assembled. A recess 248, that extends away from the filter element when the assembly is assembled, and that is coaxial with the housing head, is formed within the primary chamber 68. Further, a vent 250 that extends between the primary chamber 68 and the area surrounding it is formed in the end wall 70.

The housing head 52 is secured to the body 54 (once the filter element has been located in the housing body) by locating the flow conduit 34 of the top end cap 4 in the primary chamber 68 of the housing head through the circular aperture 74. The flow conduit 34 has an O-ring 66 on its external surface which is received by the aperture 74, in which it is compressed to form a fluid tight seal. The seating portion 238 also has an O-ring 252 which is compressed between the groove 242 of the seating portion and the side wall of the recess 248 within primary chamber 68, to form a fluid tight seal, thereby defining an auxiliary chamber 254 within the primary chamber.

The housing head 52 and body 54 are secured by rotating one relative to the other so that their cooperating screw threads at their interfaces 86, 88, are tightened to interlock with each other. Once the head is properly secured to the body 54 the vent 250 in the end wall 70 of the housing head 52 extends between the auxiliary chamber 254 and the area within the housing head surrounding the primary chamber 68.

A device 258 for measuring differential pressure is contained within the area defined by the surface 244 and the wall 256 of the seating portion 238. Suitable differential pressure measuring devices are known in existing products, for example in products sold by Domnick Hunter Limited under the trade mark OIL-X. The device 258 can be secured to the seating portion 238 by frictional forces between it and the wall 256 of the seating portion 238; i.e. the device is a secured to the seating portion 238 by a "press-fit" connection. However, other techniques can be used to secure the pressure measuring device, for example a threaded engagement or an adhesive. An O-ring 260 is provided on the pressure measuring device 258 which is compressed between the device and the wall 256 to provide a fluid tight seal between the vent 246 within the extension 236 and the axiliary chamber 254. As the vent 246 within the extension 236 is in fluid communication with gas upstream of the filter element and the auxiliary chamber 254 is in fluid communication with gas downstream of the filter element via the vent 250 in the end wall 70, the pressure measuring device is capable of measuring the pressure drop across the filter element.

The filter assembly can be disassembled by rotating the housing body 54 relative to the head 52 so that their cooperating screw threads are loosened. Any rotational force that is imparted on the top end cap 4 of the filter element by stictional forces between the O-rings 66, 252 of the end cap 4 and the housing head is negated by the opposite rotational drive that is provided by the first and second ribs 90, 91 acting against the first and second grooves 92, 93 in the housing body in which the ribs are received. Therefore, as the housing body 54 is rotated relative to the housing head 52, the filter element will tend to reside in the housing rather than be drawn away from the body with the head, and hence when the housing head 52 is removed from the housing body 54, the filter element will remain located within the body, rather than being removed from the body with the head.

The housing head includes an outlet port 58 through which gas which has passed through the wall 2 of the filter element can be supplied to a downstream application. The outlet port communicates with the annular space 64 between the wall of the filter element and the internal wall of the housing.

In use, a gas that is to be filtered enters the filter assembly through the inlet port 56 in the housing head and is directed to the hollow space 8 in the filter element by means of the primary chamber 68 in the housing head and the flow paths, 36 and 109 in the flow conduit of the filter element, and the inlet tube, respectively. A helical flow is imparted in the gas stream entering the hollow space 8 by the helically extending ridge 110, as the gas stream passes through the inlet tube. The supply of gas entering the hollow space 8 is graded due to the gradual increase in the proportion of the inlet tube that is open towards its downstream end.

From the hollow space 8, the gas flows generally radially outwardly through the filter medium of the wall 2. Any liquid in the gas stream will be coalesced by the filtration layer 10 and any coalesced liquid will be carried to the drainage layer 12 by the flow of gas, where the liquid will be retained. The liquid will tend to drain to the bottom of the drainage layer 12, where it can tend to accumulate in the part of the drainage layer 12 folded under the bottom surface 12, thereby forming a wet band. When that part of the drainage layer 12 becomes sufficiently saturated, the liquid will begin to drain from any exposed parts of that part of the drainage layer, generally in the form of drops. The compression of the drainage layer 12 by the fins 96 will tend to encourage the drainage of liquid from the drainage layer along the fins.

Filtered gas exiting the filter element enters the annular space 64 between the filter element and the housing. Filtered gas is then discharged from the filter assembly through the outlet port 58 in the housing head 52, which is in fluid communication with the annular space 64. Gas flowing from the annular space 64 to the outlet port 58 is directed around the internal cylindrical wall 72 of the housing head 52, and toward the outlet port, by the tapered rib 91 that is located directly underneath the cylindrical side wall.

What is claimed is:

1. A hollow filter element for removing material that is entrained in a gas stream, the filter element comprising:

a wall of a filtration medium which defines a hollow space so that a gas stream can flow from the space through the wall in order to be filtered, the wall comprising a filtration layer, and a drainage layer located outside the filtration layer in which liquid separated from the gas stream can collect, and first and second end caps at opposite ends of the space, the first end cap including an inlet for a gas stream to be supplied to the space, in which the drainage layer extends from the wall over at least a part of the external surface of second end cap, over the face thereof which faces away from the first end cap.

2. A filter element as claimed in claim 1, in which the second end cap provides a trough in which the filtration layer is retained, and in which the drainage layer is wrapped around the outside of the end cap.

3. A filter element as claimed in claim 1, which includes a clamp for fastening the drainage layer to the surface of the second end cap which faces away from the first end cap.

4. A filter element as claimed in claim 1, in which the second end cap includes an upstand portion which extends towards the first end cap, into the space within the filter element.

5. A filter element as claimed in claim 4, in which the upstand portion of the second end cap tapers inwardly towards the end thereof which is closer to the first end cap.

6. A filter element as claimed in claim 1, in which the second end cap includes a flange which defines an annular slot in which the drainage layer can be inserted to retain it in place over the external surface of the end cap.

7. A filter element as claimed in claim 6, in which the flange is provided on a stem.

8. A filter element as claimed in claim 6, which includes a ring member which can be fitted into the annular slot over the drainage layer to retain the drainage layer in the slot.

9. A filter assembly for collecting material that is entrained in a gas stream which comprises a filter element as claimed in claim 1 and a housing in which the filter element is received.

10. A filter assembly as claimed in claim 9, in which the drainage layer is compressed between second end cap and the housing wall by means of at least one longitudinally extending fin.

11. A filter assembly as claimed in claim 10, in which the angle between the fin and the axis of the housing is not more than about 20°.

12. A filter assembly as claimed in claim 9, in which the drainage layer is compressed between the second end cap and the housing wall by means of at least two longitudinally extending fins.

13. A filter assembly as claimed in claim 12, in which the fins are spaced apart around the filter element approximately uniformly.

14. A filter assembly as claimed in claim 9, in which the fin is provided on the internal wall of the housing.

15. A filter assembly as claimed in claim 14, in which the fin is formed integrally with the wall of the housing.

16. A filter assembly as claimed in claim 9, in which the length of the fin, measured from the second end of the filter element towards the first end thereof, is at least about 1.0 cm.

17. A filter assembly as claimed in claim 9, in which the ratio of the length of the fin, measured from the second end of the filter element towards the first end thereof to the length of the filter element is at least about 0.02.

18. A hollow filter element, comprising:
a ring of a filtration medium which defines a hollow central space circumscribing a central axis, the ring comprising a filtration layer, and a drainage layer surrounding the filtration layer, and
first and second end caps at opposite ends of the ring, the first and second end caps each having an interior surface facing the media ring, and an exterior end surface facing in an axial direction away from the media ring, the first end cap including an opening into the central space,
wherein the drainage layer extends from the ring over at least a part of the exterior end surface of the second end cap.

* * * * *